(12) United States Patent
Dan-Jumbo

(10) Patent No.: US 10,155,581 B2
(45) Date of Patent: Dec. 18, 2018

(54) BONDED AND TAILORABLE COMPOSITE ASSEMBLY

(71) Applicant: The Boeing Company, Chicago, IL (US)

(72) Inventor: Eugene A. Dan-Jumbo, Bothell, WA (US)

(73) Assignee: The Boeing Company, Chicago, IL (US)

( * ) Notice: Subject to any disclaimer, the term of this patent is extended or adjusted under 35 U.S.C. 154(b) by 241 days.

(21) Appl. No.: 15/191,527

(22) Filed: Jun. 24, 2016

(65) Prior Publication Data

US 2016/0297512 A1 Oct. 13, 2016

Related U.S. Application Data

(60) Division of application No. 14/098,131, filed on Dec. 5, 2013, now Pat. No. 9,415,858, which is a
(Continued)

(51) Int. Cl.
*B64C 3/20* (2006.01)
*B32B 5/12* (2006.01)
(Continued)

(52) U.S. Cl.
CPC .................. *B64C 3/20* (2013.01); *B32B 3/10* (2013.01); *B32B 5/12* (2013.01); *B32B 5/26* (2013.01); *B32B 7/02* (2013.01); *B32B 27/08* (2013.01); *B32B 27/20* (2013.01); *B32B 27/38* (2013.01); *B64C 3/182* (2013.01); *B64C 3/185* (2013.01); *B64C 5/02* (2013.01); *B64C 5/06* (2013.01); *B32B 2262/106* (2013.01); *B32B 2307/544* (2013.01); *B32B 2307/546* (2013.01);
(Continued)

(58) Field of Classification Search
CPC ........... B64C 3/18; B64C 3/185; B64C 3/187; B64C 3/20; B64C 5/02; B64C 5/06; B64C 2001/0072
See application file for complete search history.

(56) References Cited

U.S. PATENT DOCUMENTS

| | | | |
|---|---|---|---|
| 5,216,799 A | 6/1993 | Charnock et al. |
| 5,866,272 A | 2/1999 | Westre et al. |

(Continued)

FOREIGN PATENT DOCUMENTS

| | | | |
|---|---|---|---|
| CN | 103038052 A | 4/2013 |
| CN | 103661918 A | 3/2014 |

(Continued)

OTHER PUBLICATIONS

D'Brien, "Interlaminar Fracture of Composites," Langley Research Center, NASA, Technicaly Memorandum 85768, Jun. 1984, 40 pages.

(Continued)

*Primary Examiner* — Nicholas McFall
(74) *Attorney, Agent, or Firm* — Yee & Associates, P.C.

(57) ABSTRACT

An all-composite assembly such as a composite laminate aircraft empennage has vertical and horizontal stabilizers with differing sets of interlaminar fracture toughnesses and differing stiffnesses to improve flight characteristics. Composite laminate skins are bonded to unitized and stiffened understructure to reduce weight and improve damage containment.

18 Claims, 15 Drawing Sheets

Related U.S. Application Data continuation-in-part of application No. 13/596,989, filed on Aug. 28, 2012, now Pat. No. 8,851,422.

(51) Int. Cl.

| | | |
|---|---|---|
| *B32B 5/26* | (2006.01) | |
| *B32B 27/08* | (2006.01) | |
| *B32B 27/20* | (2006.01) | |
| *B32B 27/38* | (2006.01) | |
| *B32B 3/10* | (2006.01) | |
| *B64C 3/18* | (2006.01) | |
| *B64C 5/02* | (2006.01) | |
| *B64C 5/06* | (2006.01) | |
| *B32B 7/02* | (2006.01) | |

(52) U.S. Cl.
CPC ... *B32B 2307/552* (2013.01); *B32B 2307/558* (2013.01); *B32B 2603/00* (2013.01); *B32B 2605/18* (2013.01)

(56) References Cited

U.S. PATENT DOCUMENTS

| | | | |
|---|---|---|---|
| 6,217,000 | B1 | 4/2001 | Younie et al. |
| 7,097,731 | B2 | 8/2006 | Puriefoy et al. |
| 8,524,356 | B1 | 9/2013 | Dan-Jumbo et al. |
| 8,851,422 | B2 | 10/2014 | Dan-Jumbo |
| 9,415,858 | B2 | 8/2016 | Dan-Jumbo |
| 2006/0249626 | A1* | 11/2006 | Simpson .......... B64C 3/20 244/123.1 |
| 2008/0265093 | A1* | 10/2008 | Munoz Lopez ...... B29C 70/342 244/119 |
| 2008/0277531 | A1 | 11/2008 | Ackermann et al. |
| 2011/0045232 | A1 | 2/2011 | Kismarton |
| 2011/0259514 | A1 | 10/2011 | Boyle et al. |
| 2011/0268926 | A1 | 11/2011 | Cruz et al. |
| 2014/0061385 | A1 | 3/2014 | Dan-Jumbo |
| 2016/0046361 | A1 | 2/2016 | Dan-Jumbo |

FOREIGN PATENT DOCUMENTS

| | | |
|---|---|---|
| EP | 0485027 A1 | 5/1992 |
| EP | 2669331 A1 | 12/2013 |
| EP | 2703283 A2 | 3/2014 |
| JP | H9193296 A | 7/1997 |
| JP | 2006512240 A | 4/2006 |
| WO | WO2010055811 A | 4/2012 |

OTHER PUBLICATIONS

Partial International Search Report, dated Jan. 13, 2015, regarding Application No. PCT/US2014/049548, 6 pages.
International Search Report and Written Opinion, dated May 28, 2015, regarding Application No. PCT/US2014/049548, 16 pages.
International Search Report and Written Opinion, dated Jun. 7, 2016, regarding Application No. PCT/US2014/049548, 10 pages.
Office Action, dated May 13, 2014, regarding U.S. Appl. No. 13/596,989, 12 pages.
Notice of Allowance, dated Jul. 31, 2014, regarding U.S. Appl. No. 13/596,989, 7 pages.
State Intellectual Property Office of PRC Notification of Second Office Action and English Translation, dated Feb. 12, 2018, regarding Application No. 201480055203.9, 19 pages.
State Intellectual Property Office of PRC Notification of First Office Action and English Translation, dated Jul. 17, 2017, regarding Application No. 201480055203.9, 19 pages.
Japanese Patent Office Notice of Reasons for Rejection and English Translation, dated Aug. 7, 2018, regarding Application No. 2016535240, 6 pages.

* cited by examiner

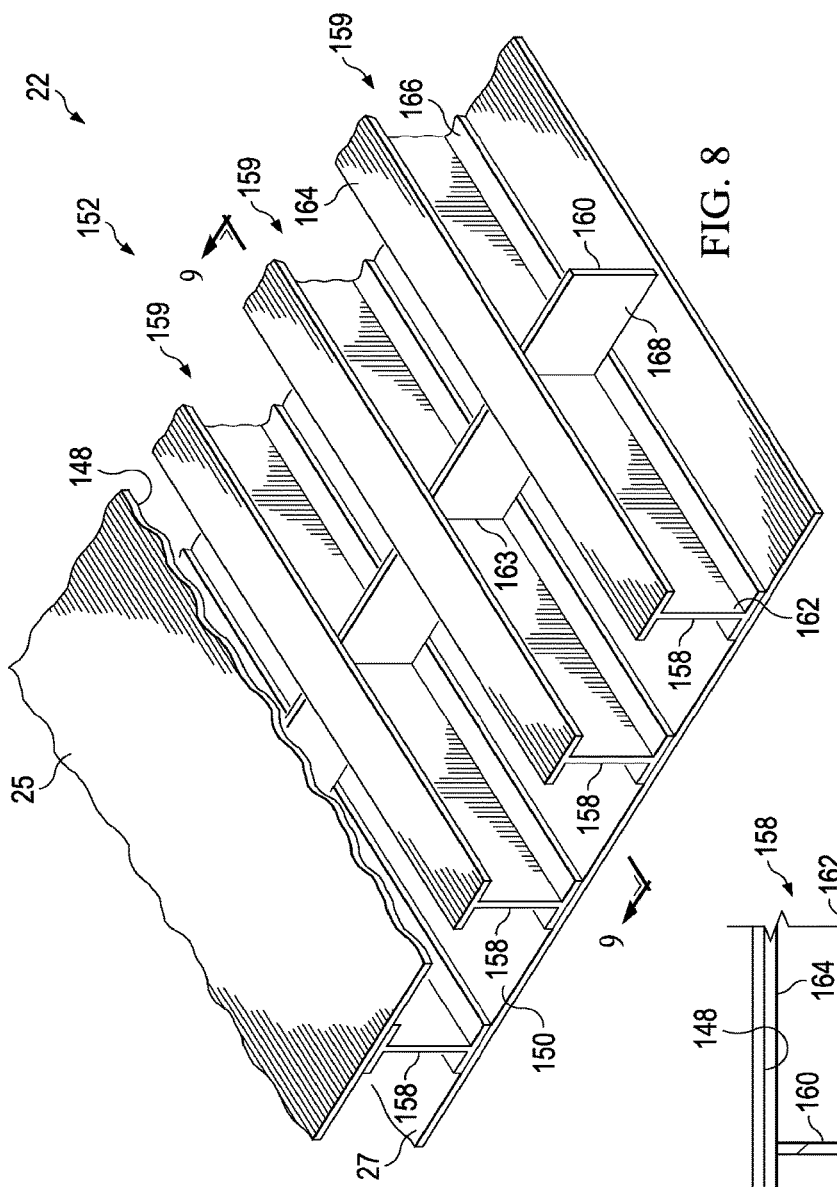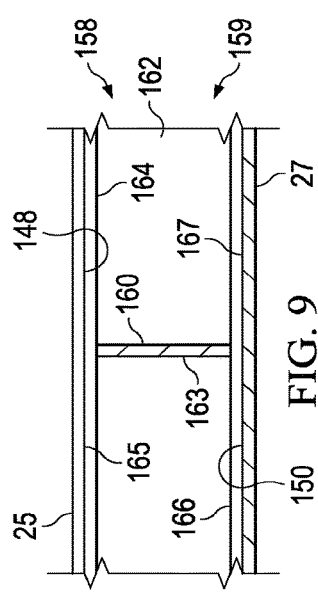

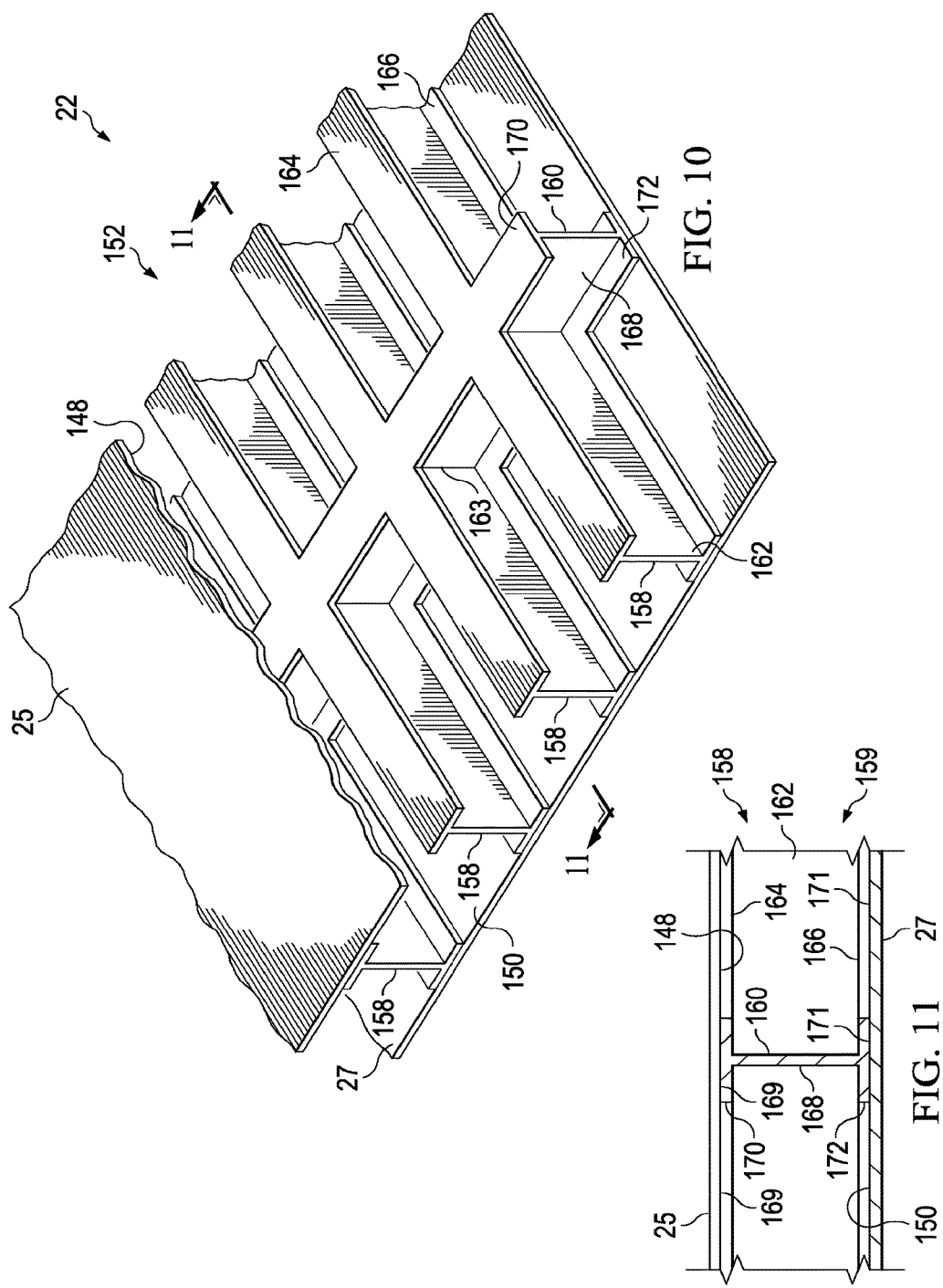

BONDED AND TAILORABLE COMPOSITE ASSEMBLY

CROSS REFERENCE TO RELATED APPLICATIONS

This application is a divisional application of U.S. patent application Ser. No 14/098,131, filed Dec. 5, 2013, which is a continuation-in-part of prior U.S. patent application Ser. No. 13/596,989 filed Aug. 28, 2012, the entire disclosures of which are incorporated by reference herein.

BACKGROUND INFORMATION

1. Field

The present disclosure generally relates to composite structures, and deals more particularly with a bonded and tailorable composite assembly, such as an aircraft empennage.

2. Background

Composite materials have been integrated into airfoil designs in recent years in order to reduce aircraft weight. For example, airfoils such as vertical and horizontal stabilizers have been designed with an outer composite laminate skin. However, due to design limitations, interior structural components of these stabilizers, such as spars, stringers and chords, are predominantly fabricated from metal such as aluminum or titanium, all secured together with metal fasteners. These metal components add undesired weight to the aircraft, and are both time consuming and labor intensive to fabricate and assemble. In order to decrease aircraft weight and increase fuel savings, a greater use of lightweight materials such as bonded, rather than fastened composites is required, however known designs have limitations that make replacement of metal components with composites challenging. Moreover, these limitations make it difficult to obtain certification of components and subassemblies by certification authorities.

In addition to the problems discussed above, vertical and horizontal stabilizer designs that rely on extensive use of metal components are not easily tailored to optimize a combination of flight characteristics, such as lift, bending and torsional stiffness, and discrete damage containment/arrestment. Also, the use of many separate spars and/or chords in these stabilizer designs may make it difficult to optimize load transfer from the outer skins. Further, known stabilizers having control surfaces such as elevators and rudders often require the incorporation of flutter pumps or reactive masses that are connected to the control surfaces in order to control aeroelastic stability commonly referred to as flutter. The use of these flutter control devices adds undesired weight and complexity to the aircraft.

Accordingly, there is a need for a composite assembly such as an aircraft empennage having unitized and bonded, all composite vertical and horizontal stabilizers that substantially reduce or eliminate the need for metal components, including fasteners, and eliminate the need for flutter control devices. There is also a need for a more efficient empennage with vertical and horizontal stabilizers having composite outer skins with individually tailored interlaminar fracture toughnesses as well as stiffnesses, and an integrated all-composite grid understructure structure that permits tailoring the stabilizers to optimize flight characteristics, service life durability and failsafe reliability.

SUMMARY

The disclosed embodiments provide a multi-functional, tailored, and integrated composite bonded orthotropic composite assembly, such as aircraft empennage, with a Z-stiffened grid-like composite understructure. The all-composite bonded empennage has two multi-functional aircraft horizontal stabilizers and an aircraft vertical stabilizer, each of which has uniquely designed structural properties with different, tailorable, interlaminar fracture toughness modes, improved structural elastic constants, and stiffnesses provided by the disclosed skins and bonded understructures. These qualities provide the empennage with improved structural fail-safe, higher durability and damage tolerance, higher and improved aerodynamically balanced lift, and substantially improved critical aerodynamic stability and control, with substantial reductions in aircraft weight. An empennage incorporating a combination of a multi-performance orthotropic bonded composite laminate skin, with a Z-stiffened integrated grid understructure having tailorable different interlaminar fracture toughnesses, may provide substantial improvements in fuel savings, damage containment capability, stability control, and fail-safe design of aircraft incorporating such empennages. In addition, the structural properties of the empennage may eliminate the need for flutter control devices, thereby reducing aircraft weight and complexity. While an aircraft empennage is disclosed, the all bonded, composite assembly may be used in a variety of applications, including but not limited to aerospace vehicles, marine vehicles, land vehicles, and wind driven machines, to name only a few. The disclosed composite assembly may also be used in non-vehicle related applications, such as in the building construction and other industries.

The skins each have interlaminar fracture toughness mixed Modes that provide increased fiber stiffness, and improved reaction to global bending and torsion loads on control surfaces. The bonded composite empennage structure is divided into multiple interlaminar fracture Modes I, II, III, resulting in higher stability control for upper and lower skin surfaces that are integrally bonded to the Z-stiffened understructure. "Mixed Modes" refers to the presence of a combination of Modes I, II and III that result in complex skin loading interactions. The integrated understructure reduces unnecessary high hinge loads on critical control surfaces, and increases lift with minimum aircraft rotation while damping flutter loads on the empennage. The composition of the bonded skins of each of the stabilizers of the empennage is tailorable, having differing interlaminar fracture toughnesses in Modes I, II and III which increase the capability of the structure to contain any accidental discrete damage caused by an engine explosion or impacts with foreign objects, thereby improving damage tolerance required by aircraft certifying authorities.

The understructure of the horizontal and vertical stabilizers comprises three main composite high modulus spars bonded to and stiffened by Z-stiffeners which have high fiber stiffness, improved different interlaminar elastic constants and composites having selected Mode I, II and III properties. The Mode I, II and III properties of the vertical and horizontal stabilizers skins are separately tailored in order to provide the empennage with higher transverse tension, shear and torsional stiffness. These features result in a tailorable empennage having higher aerodynamic balanced lift and control stability during flight, and a reduction in the amount of effort required to move control surfaces by up to 50%.

The composite stabilizer skins are designed with different sets of interlaminar fracture toughnesses in Modes I, II and III, with high fiber elastic constants, and high stiffness to increase aerodynamic balanced higher lift, reduce maneuver loads, stabilize the attack angle to a minimum, reduce global shear and torsion loads, reduce flutter, engine thrust, and especially large out of plane hinge loads. The skins of the vertical stabilizer have interlaminar fracture toughnesses in Modes I, II and III that are different from those of the horizontal stabilizers. The disclosed bonded and integrated empennage provides self-containment of discrete damage, and extensive reduction of the interlaminar singular edge peel loads and shear stress at each intersection of the understructure grid and Z-stiffeners to sustain improved aerodynamic lift, diminish aircraft rotation, diminish hinge loads, regardless of any hard-points needed to attachment lugs for the horizontal tails, dorsal bath-tub fitting, and stiffness mismatches.

The high out-of-plane peel and lateral empennage adhesive interface stresses are greatly minimized to balance out the aerodynamic loads during high turbulence and high pitch take off loads. The interfacial bonded stresses are redistributed uniformly throughout the empennage skins and understructure, thereby reducing high torsion, global & local bending loads on control surfaces hinge lugs due to turbulence during flight, rendering the control surfaces substantially fail-safe. A high interlaminar mode III torsion capability also increases the high vertical deflection on the horizontal stabilizers. Thus, the disclosed empennage efficiently reacts to the gust, and maneuver loads in flight, leading to a higher balanced aerodynamic lift of the aircraft & reduced vertical flutter loads.

The understructure has a moderate to high stiffness in order to react most wing & fuselage flight loads such as heavy bending moments, torsion, or skin in-plane shear stresses. The bonded understructure also minimizes up and down bending due to lateral gusts or maneuver loads by redistributing the resultant loads through the bonded fail-safe joints. The stress singularities that normally develop at the bonded joint run-outs are also drastically reduced with an adhesive taper spew at the edges of the Z-stiffened understructure cap with empennage skins.

The disclosed empennage reduces loads on the horizontal tail/elevator hinge, side body lug joints and bathtub fittings attachments to rudder hinge joints by load redistribution across a larger bonded area, thus reducing the overall effects of concentrated fuselage side body bending loads in the joint during flight. The empennage design also reduces the overall aircraft weight, eliminates fasteners, and also increases the EME capability of the empennage, and thus increases pitch angle faster and more efficiently. The all bonded composite empennage gives the aircraft an angle to the airflow which produces a higher lift on the horizontal tails and vertical tail.

According to one disclosed embodiment, a composite assembly comprises a first composite structure and at least one second composite structure. The first composite structure includes a composite first understructure and a composite first laminate skin bonded to the first understructure. The composite first laminate skin has a first set of pre-selected interlaminar fracture toughnesses. The second composite structure includes a composite second understructure and a composite laminate second skin bonded to the second understructure. The composite laminate second skin has a second set of pre-selected interlaminar fracture toughnesses. Each of the composite laminate first and second skins is subject to Mode I, II and III loading. The first and second sets of interlaminar fracture toughness are different from each other in the Mode I, II and III. The torsional stiffness of the first composite structure is greater than the torsional stiffness of the second composite structure. "Torsional stiffness", sometimes known in the art as torsional rigidity, is a measure of the ability of an elongate structural member such as the vertical stabilizer, to resist deformation in response to an applied torque.

The first composite structure the composite assembly has a torsional stiffness within the range of approximately 45.0 to 52.0 million pounds per square inch, and the second composite structure has a torsional stiffness within the range of approximately 40.0 to 50.2 million pounds per square inch. The first composite laminate skin includes a Mode I interlaminar fracture toughness within the range of approximately 4.0 to 6.5 inch-pounds per square inch, a Mode II interlaminar fracture toughness within the range of approximately 12.0 to 15.5 inch-pounds per square inch, and a Mode III interlaminar fracture toughness within the range of approximately 16.0 to 18.5 inch-pounds per square inch. The second composite laminate skin includes a Mode I interlaminar fracture toughness within the range of approximately 2.5 to 3.5 inch-pounds per square inch, a Mode II interlaminar fracture toughness within the range of approximately 7.5 to 9.5 inch-pounds per square inch, and a Mode III interlaminar fracture toughness within the range of approximately 18.0 to 20.5 inch-pounds per square inch.

The first understructure comprises a plurality of longitudinally extending composite spars, and a plurality of Z-shaped composite stiffeners extending between and bonded to the spars. Each of the composite spars and the Z-shaped composite stiffeners is generally I-shaped in cross-section and includes a pair of caps. The caps of the composite spars and the caps of the Z-shaped composite stiffeners are bonded together. The composite assembly further comprises a plurality of substantially straight, composite cross-beams respectively passing through the Z-shaped composite stiffeners and extending substantially normal to the composite spars. The composite assembly also includes a plurality of longitudinally extending, composite stringers. The elongate composite stringers pass through the Z-shaped composite stiffeners and are bonded to at least one of the first and second skins. The first and second composite structures may be stabilizers arranged to form an aircraft empennage.

According to another disclosed embodiment, a composite structure comprises a composite laminate skin bonded to a composite understructure. The understructure includes first and second, longitudinally extending composite spars and a first plurality of Z-shaped composite stiffeners extending between and bonded to the first and second composite spars. Each of the first and second composite spars and the Z-shaped composite stiffeners is substantially I-shaped in cross-section. The first composite spar includes a first cap, the second composite spar includes a second cap, and each of the Z-shaped composite stiffeners includes a third cap bonded to each of the first and second caps. The understructure further includes a plurality of substantially straight, composite cross-beams respectively passing through the Z-shaped composite stiffeners, each of the composite cross-beams extending substantially normal to the first and second composite spars. Each of the Z-shaped composite stiffeners includes a web having a height, and each of the cross-beams includes opposite ends bonded to a corresponding Z-shaped composite stiffener along substantially the entire height of the web. The composite structure may further comprise a third longitudinally extending composite spar and a second plurality of Z-shaped composite stiffeners extending between and bonded to the second third composite spars. The first composite spar is a front spar, the second composite spar is a mid-spar, and the third composite spar is an aft-spar. Each of the first and second composite spars includes first and second spar caps, and each of the Z-shaped stiffeners includes first and second stiffener caps. The composite laminate skin is bonded to the first and second spar caps and the first and second stiffener caps.

According to still another embodiment, an aircraft empennage comprises a vertical stabilizer and at least one horizontal stabilizer. The vertical stabilizer has a composite laminate first skin and a composite first understructure bonded to the first skin. The composite laminate first skin is subject to Mode I, II and III loading and has a first set of interlaminar fracture toughnesses in each of these three modes. The composite first understructure includes an integrated grid of composite spars, composite cross-beams and composite stiffeners bonded together. The at least one horizontal stabilizer includes a composite laminate second skin and a composite second understructure bonded to the first skin. The composite laminate second skin is also subject to Mode I, II and III loading and has a second set of interlaminar fracture toughnesses in each of the three modes. The composite second understructure includes an integrated grid of composite spars, composite cross-beams and composite stiffeners bonded together. The composite laminate first skin includes a Mode I interlaminar fracture toughness within the range of approximately 4.0 to 6.5 inch-pounds per square inch, a Mode II interlaminar fracture toughness within the range of approximately 12.0 to 15.5 inch-pounds per square inch, and a Mode III interlaminar fracture toughness within the range of approximately 16.0 to 18.5 inch-pounds per square inch. The composite laminate second skin includes a Mode I interlaminar fracture toughness within the range of approximately 2.5 to 3.5 inch-pounds per square inch, a Mode II interlaminar fracture toughness within the range of approximately 7.5 to 9.5 inch-pounds per square inch, and a Mode III interlaminar fracture toughness within the range of approximately 18.0 to 20.5 inch-pounds per square inch. The vertical stabilizer has a torsional stiffness within the range of approximately 45.0 to 52.0 million pounds per square inch, and each of the horizontal stabilizers has a bending stiffness within the range of approximately 30.0 to 36.5 million pounds per square inch. "Bending stiffness", sometimes referred to in the art as flexural rigidity, is a measure of the ability of an elongate structural member such as each of the horizontal stabilizers 32, to resist deformation in response to an applied bending moment along the longitudinal axis of the structural member. Each of the spars has a bending stiffness of approximately 45 million pounds per square inch. Each of the composite stiffeners is Z-shaped, and each of the composite cross-beams passes through one of the Z-shaped composite stiffeners. Each of the composite first and second understructures further includes stringers passing through the composite stiffeners and bonded to a corresponding one of the first and second skins.

According to a further embodiment, a method is provided of making a composite structure. A plurality of composite spars and a plurality of composite stiffeners are fabricated. A composite understructure is formed by bonding the composite spars and the composite stiffeners together. First and second composite skins are bonded to opposite sides of the composite understructure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of illustrative embodiments of the present disclosure when read in conjunction with the accompanying drawings, wherein:

FIG. 8 is a perspective illustration of a portion of the wing shown in FIG. 1, a part of the upper wing skin broken away to reveal details of one embodiment of the inner wing-grid structure.

FIG. 9 is a sectional view taken along the line 9-9 in FIG. 8.

FIG. 10 is an illustration similar to FIG. 8 but showing an alternate form of the wing-grid structure.

FIG. 11 is a sectional view taken along the line 11-11 in FIG. 10.

DETAILED DESCRIPTION

The disclosed embodiments provide an all composite bonded and integrated, orthotropic composite assembly such as an empennage that substantially eliminates the need for metallic components, including fasteners. While an aircraft empennage embodiment will be described in detail below for illustrative purposes, it is to be understood that other embodiments of the disclosed composite assembly are possible which may be used in a wide range of other applications. The empennage includes vertical and horizontal stabilizers with composite laminate skins that are bonded to all-composite understructures. The skins of the vertical and horizontal stabilizers have properties that are tailored relative to each other, and which are selected to provide the empennage with improved structural fail-safe design, greater durability, higher and improved aerodynamically balanced lift, reduced flutter loads and improved aerodynamic stability and control, with reductions in aircraft weight. The skins of the vertical and horizontal stabilizers possess greater toughnesses which increase the capability of the empennage to contain any accidental, discrete damage, thus enabling it to meet damage tolerance airworthy requirements per FAA FA R 25-571e, EASA certification, and FA R 26. Structural properties of the disclosed empennage substantially reduce flutter, and may eliminate the need for flutter control devices on control surfaces.

Figure 1:
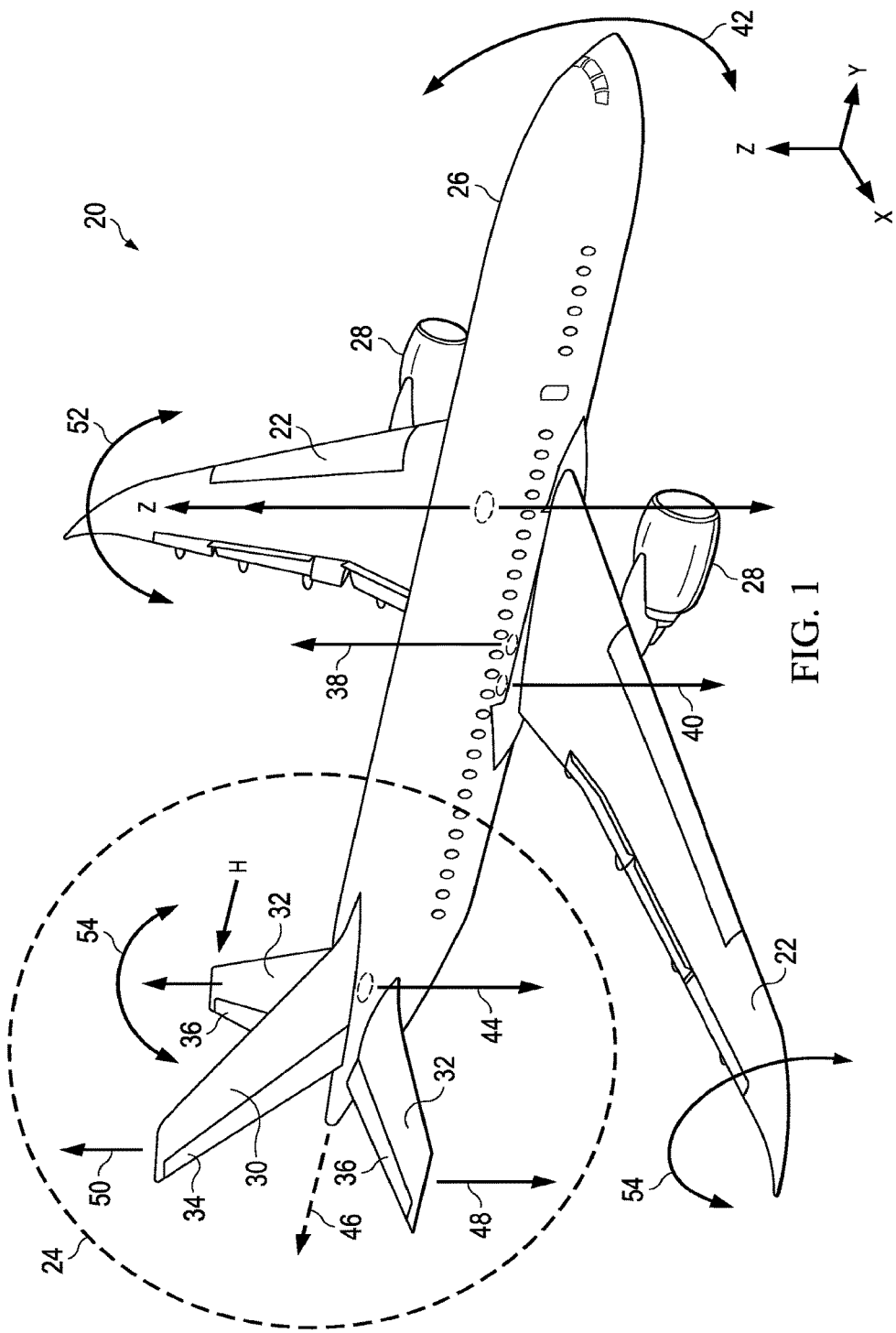
FIG. 1 is an illustration of a perspective view of an aircraft showing various loads affecting flight characteristics of the aircraft.

Referring first to FIG. 1, an aircraft 20 includes a pair of wings 22 and a composite assembly 24 which may comprise a stabilizer assembly, also sometimes referred to herein as an empennage 24, attached to a fuselage 26. Engines 28 provide the aircraft 20 with thrust. The empennage 24 includes a first composite structure 30 in the form of a vertical stabilizer 30, and a second composite structure 32 in the form of a pair of horizontal stabilizers 32. In some embodiments, the empennage 24 may have more than one vertical stabilizer 30. According to the disclosed embodiments, the vertical stabilizer 30 and each of the horizontal stabilizers 32 may be all-composite bonded structures. The vertical stabilizer 30 includes a movable rudder 34 for controlling yaw of the aircraft 20, and the horizontal stabilizers 32 include movable elevators 36 for controlling the pitch of the aircraft 20. The vertical stabilizer 30 and the horizontal stabilizers 32 are each covered with later discussed outer composite laminate skins having pre-selected interlaminar fracture toughnesses in Modes, I, II and III. Interlaminar fracture toughness is measured in units of inch-pounds of force per square inch.

As will be discussed below in more detail, the all-composite vertical stabilizer 30 is bonded to an advanced composite structural material and has a fiber stiffness on the order of 30 MSI (million pounds per square foot) and pre-selected Mode I, II and III interlaminar fracture toughnesses. Each of the all-composite horizontal stabilizers 32 is also bonded to a composite material and has a fiber stiffness on the order of 40 MSI (million pounds per square foot), and a second set of pre-selected Mode I, II and III interlaminar fracture toughnesses. The first and second sets of interlaminar fracture toughnesses respectively of the vertical and horizontal stabilizers 30, 32 are different from each other. The composite structural material from which the vertical stabilizer 30 and the horizontal stabilizers 32 are formed may comprise any of a variety of fiber reinforced resin materials such as, without limitation a CFRP (carbon fiber reinforced plastic) laminate. The construction and materials used in the all-composite, bonded empennage 24 provide the aircraft 20 with improved balance and lift.

A variety of loads and forces act on the aircraft 20 that must be reacted in order to maintain stable and controllable flight. For example, as depicted in FIG. 1, forces acting on the wings 22 and the horizontal stabilizers 32 create moments 52, 54 about the Y axis while the aircraft 20 experiences thrust 42 and drag 46. The lift 38 provided by the wings 22 is reacted by the weight 40 of the aircraft 20 and balancing loads 44. The empennage 24 must also react to elevator forces 48 and rudder forces 50.

In accordance with the disclosed embodiments, the vertical stabilizer 30 and the horizontal stabilizers 32 each has uniquely designed structural properties with differing sets of pre-selected interlaminar fracture toughnesses in Modes I, II and III, improved structural elastic constants, and improved stiffnesses. These qualities provide the empennage 24 with improved structural failsafe, higher durability and damage tolerance, higher and improved aerodynamically balanced lift and greatly improved critical aerodynamic stability and control while reducing the weight of the aircraft 20. The disclosed empennage 24 reduces loads on hinge points between the horizontal stabilizers 32 and the elevators 36, side body lug joints and bathtub fitting attachments to rudder hinge joints by redistributing the load across a larger bonded area. Because the load is distributed over a larger bonded area, the overall effects of concentrated fuselage side body bending loads on the hinge joints is reduced during flight. The design of the empennage discussed below in more detail may provide the aircraft 20 with an angle to the airflow that produces a higher lift on vertical stabilizer 30 and the horizontal stabilizers 32.

Figure 2:
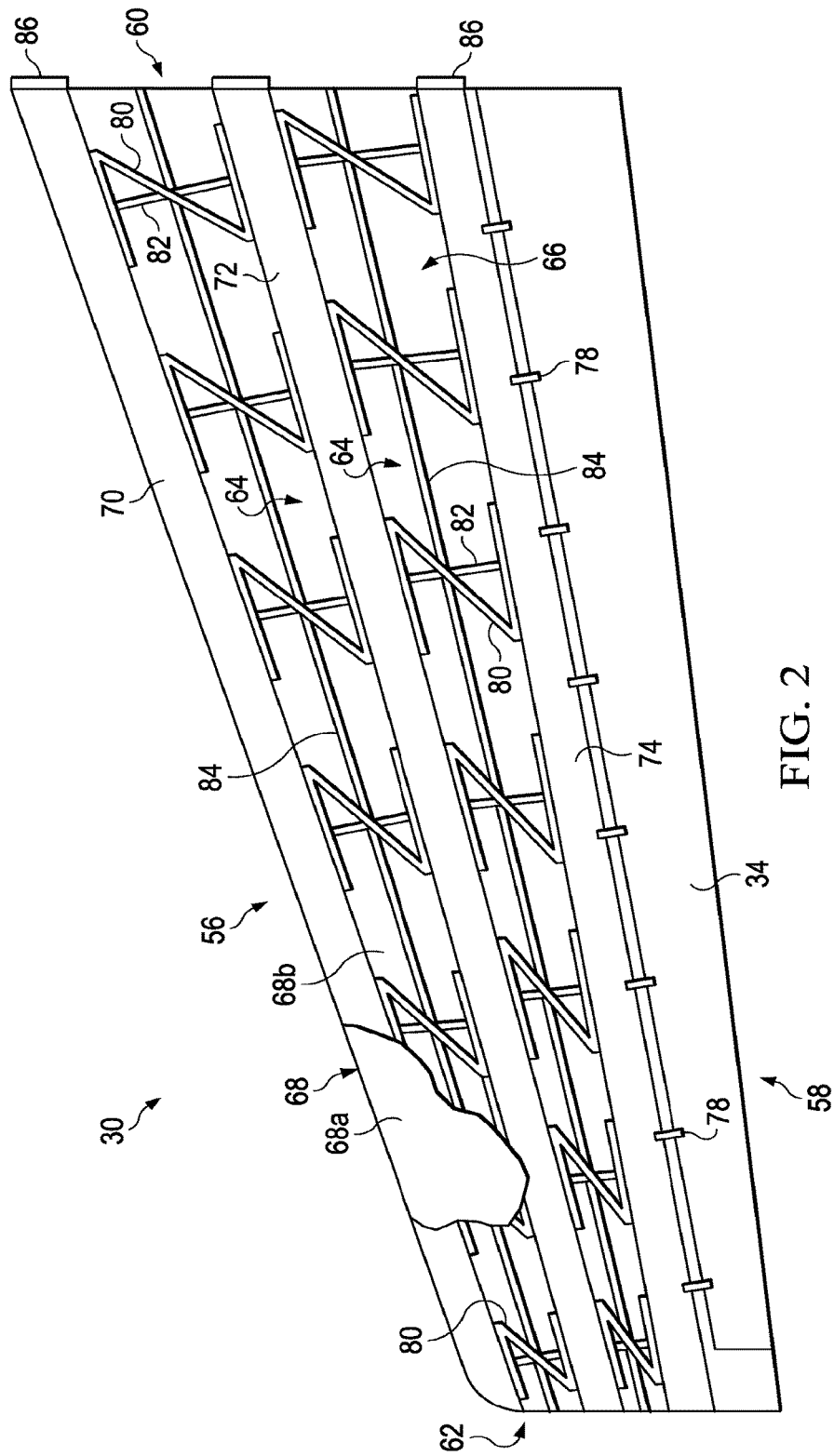
FIG. 2 is an illustration of a side view of the vertical stabilizer of the aircraft shown in FIG. 1, a skin being broken away in section to reveal an under structure.
Figure 2A:
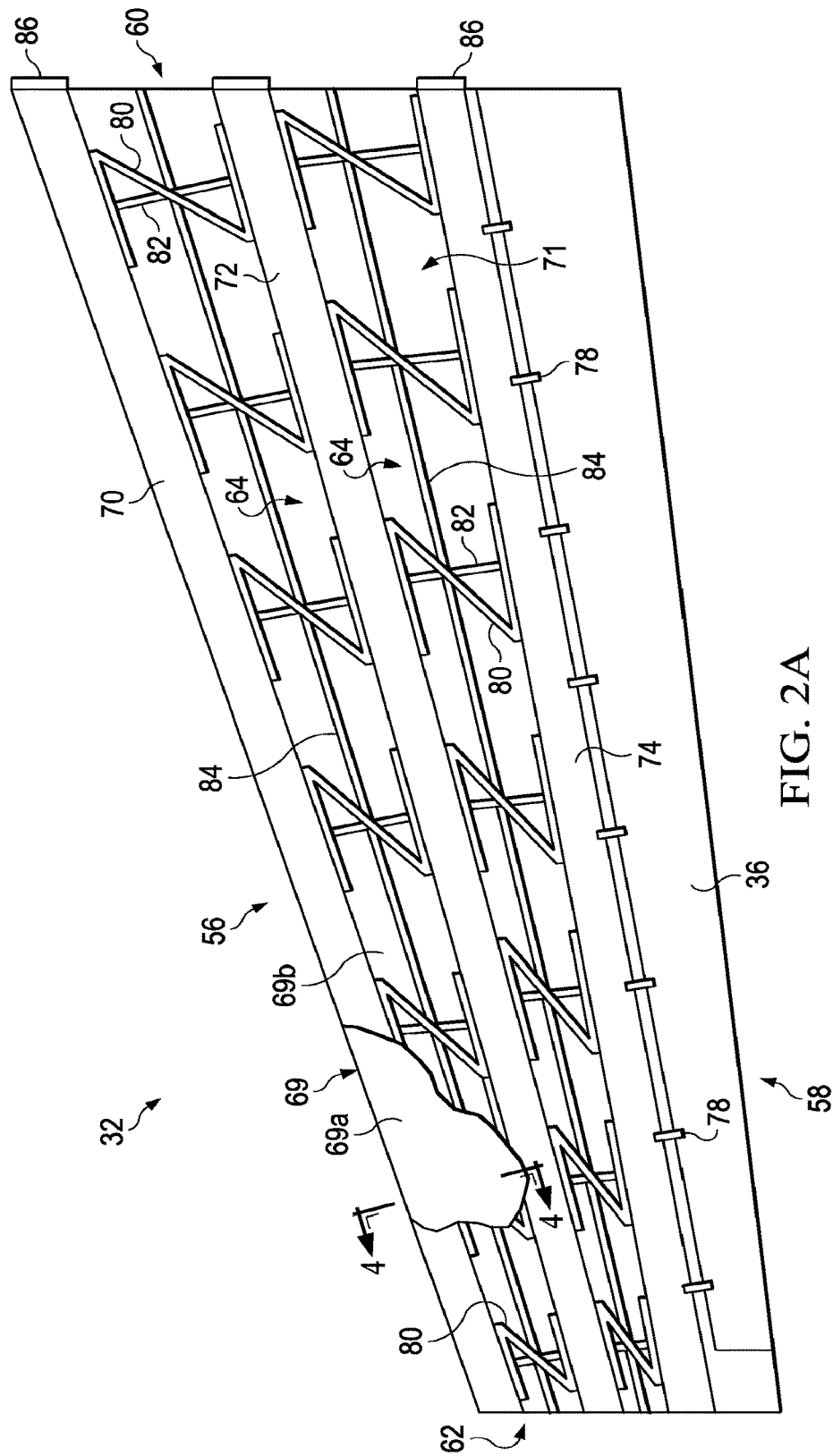
FIG. 2A is an illustration similar to FIG. 2, but showing one of the horizontal stabilizers.

Attention is now directed to FIGS. 2, 2A and which illustrate details of the structure of the vertical stabilizer 30 (FIG. 2) and the horizontal stabilizer 32 (FIG. 2A). The vertical stabilizer 30 includes a first multi-performance, orthotropic, composite laminate outer skin 68. The first outer skin 68 includes first and second skins 68a, 68b on opposite sides of the stabilizer 30 which cover and are bonded to a first unitized, all composite, integrated grid understructure 66. The first understructure 66 transfers loads from the skin 68 to the fuselage 26 (FIG. 1). The skin 68 may comprise, for example and without limitation, a composite laminate skin having multiple plies of carbon fiber epoxy.

Each of the horizontal stabilizers 32 includes a second multi-performance, orthotropic, composite laminate outer skin 69. The second outer skin 69 includes first and second skins 69a, 69b on opposite sides of the horizontal stabilizer 32 which cover and are bonded to a second unitized, all composite, integrated grid, all-composite understructure 71. The second understructure 71 transfers loads from the skin 69 to the fuselage 26 (FIG. 1). The skin 69 may comprise, for example and without limitation, multiple plies of carbon fiber epoxy.

As will be discussed below in more detail, although the first and second understructures 66, 71 are similar in structural arrangement and component parts, the first and second outer skins 68, 69 possess differing material properties which result in the vertical stabilizer 30, and the horizontal stabilizer 32 having differing, but specifically pre-selected sets of interlaminar fracture toughnesses in Modes I, II and III which tailor the empennage 24 to provide maximum performance for a given aircraft application. This tailoring of the empennage 24 may eliminate the need for flutter control devices for control surfaces such as the rudder 34 and the elevators 36. The selection of material properties for the first and second skins 68, 69 to achieve desired but different interlaminar fracture toughnesses in Modes I, II and III will sometimes be referred to herein as tailoring or "tailored" stiffnesses.

More particularly, the first and second skins 68, 69 have selected, combined interlaminar fracture toughness Modes I, II and III to provide increased fiber stiffness, and improved reaction to global bending and torsional loads on control surfaces such as the rudder 34 (FIG. 1) and the elevators 36. Structural composite stiffness properties are partly derived from high elastic modulus fibers of advanced composite structural materials used in the first skin 68 on the vertical stabilizer 30, and the second skin 69 used in each of the horizontal stabilizers 32. As previously mentioned, each of the first and second skins 68, 69 may comprise a composite laminate such as, without limitation, carbon fiber epoxy. High stiffness-to-strength ratio fibers in the structural resin of the laminate reinforce high interlaminar toughness of the structural resin with specified structural properties in Modes I, II & III. The Mode I property provides for load carrying capability of stabilizers 30, 32, while the Mode II property provides for in-plane loads and for resisting damage of the stabilizers 30, 32. The mode III property provides for twisting/torsional stiffness of the stabilizers 30, 32.

The combination of first and second composite skins 68, 69 having different interlaminar fracture toughnesses, and the stiffened, integrated grid composite understructures 66, 71 may result in a reduction in the weight of the empennage 24 while improving damage containment capability, stability control and failsafe design. Tailoring the interlaminar fracture toughnesses of the first and second skins 68, 69 skins provides the empennage 24 with a greater ability to contain any accidental, discrete damage caused by for example and without limitation, an engine explosion or an impact with foreign object, thereby proving damage tolerance.

The interlaminar fracture toughnesses of the first skin 68 in Modes I, II and III for the vertical stabilizer 30 are selected to be different from those of the second skin 69 on the horizontal stabilizers 32. In one embodiment, the interlaminar fracture toughnesses of the first skin 68 on the vertical stabilizer 30 are approximately within the following ranges:

Mode I: 4.0 to 6.5 inch-pounds per square inch,
Mode II: 12.0 to 15.5 inch-pounds per square inch,
Mode III: 16.0 to 18.5 inch pounds per square inch.

The tension, shear and torsional stiffness of the first skin 68 on the vertical stabilizer 30 is approximately within the range of 45.0 to 52.0 million pounds per square inch, and the bending stiffness of the first skin is approximately within the range of 35.0 to 38.0 million pounds per square inch. The interlaminar fracture toughnesses of the second skin 69 on each of the horizontal stabilizers 32 are approximately within the following ranges:

Mode I: 2.5 to 3.5 inch pounds per square inch,
Mode II: 7.5 to 9.5 inch pounds per square inch,
Mode III: 18.0 to 20.5 inch pounds per square inch.

The tension, shear and torsional stiffness of the second skin 69 on each of the horizontal stabilizers 32 is approximately within the range of 40.0 to 50.2 million pounds per square inch, and the bending stiffness of the second skin 69 on each of the horizontal stabilizers 32 is approximately within the range of 30.0 to 36.5 million pounds per square inch.

Selection of higher interlaminar fracture toughness in Modes II and III for the skin 68 of the vertical stabilizer 30 relative to the skin 69 on the horizontal stabilizers 32, along with its higher tension, shear and torsional stiffness, effectively allows the vertical stabilizer 30 to dampen flutter aerodynamic loads on the aircraft 20. Further, the use of mixed Modes in the skin 68 reduces abnormal global bending effects at the hinge points of the rudder 34 and elevators 36.

Differing interlaminar fracture toughnesses of the skin 68 on the vertical stabilizer 30 and the skin 69 on the horizontal stabilizer 32 may be achieved by varying any one or more of several skin parameters, resulting in the two skins 68, 69 have varying differing stiffnesses. For example, although the ply schedule (stack) used to fabricate the skins 68, 69 respectively on the vertical and horizontal stabilizers 30, 32 may both be orthotropic, the ply schedule used for the one of the skins 68, 69 may have fewer 0° plies than the ply schedule used for the other skin 68, 69, resulting in one of the skins 68, 69 being less stiff and orthotropic than the other skin 68, 69. Alternatively, the desired difference in interlaminar fracture toughness of the two skins 68, 69 may be achieved by using a different resin, using a different fiber material, or using different fiber diameters.

Figure 3:
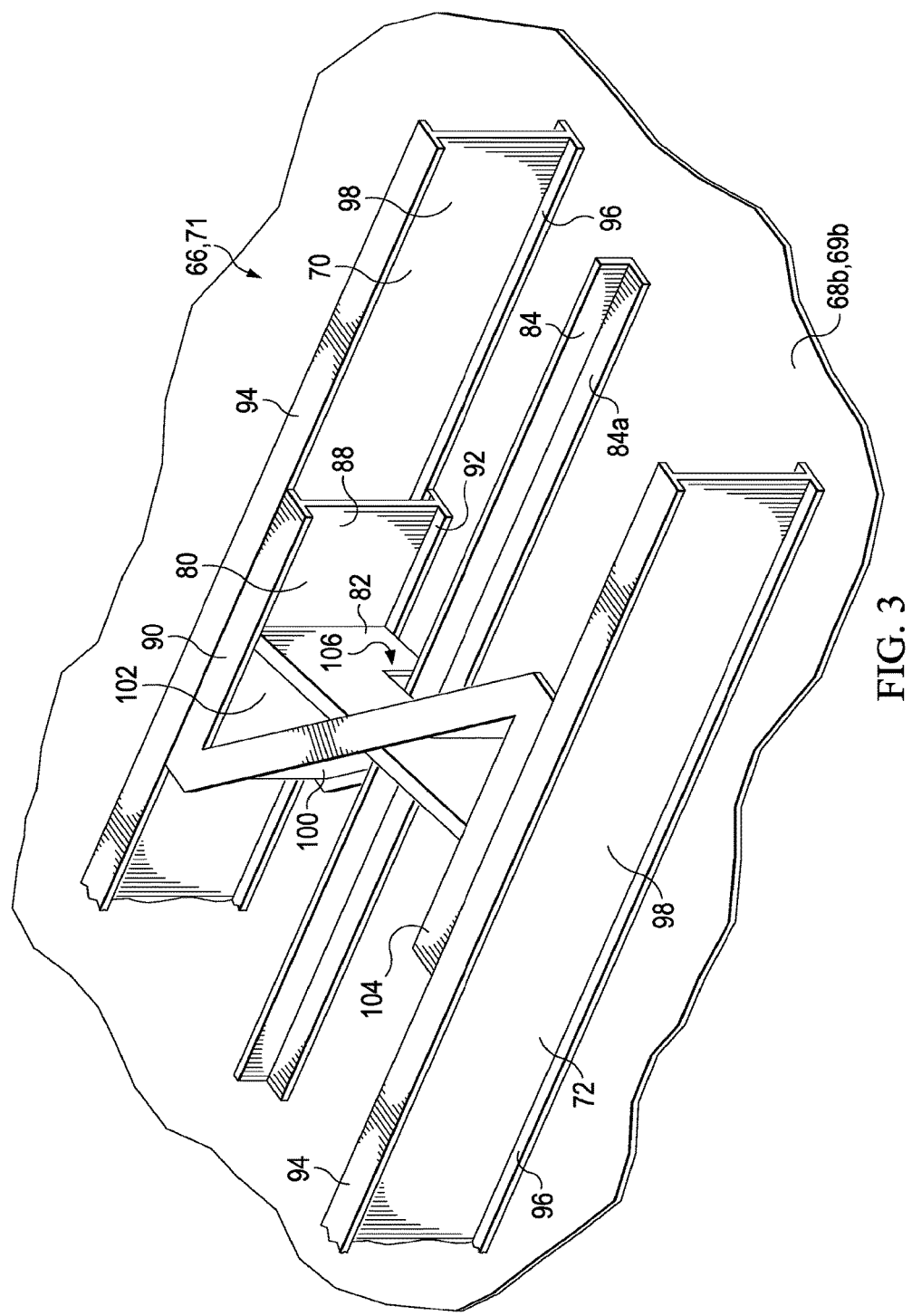
FIG. 3 is an illustration of a perspective view showing additional details of the Z-stiffening between two of the spars of the horizontal stabilizer shown in FIG. 2A.

As shown in FIGS. 2, 2A and 3, the first understructure 66 of the vertical stabilizer 30 (FIG. 2) and the second understructure 71 of the horizontal stabilizers 32 (FIG. 2A) each comprises a grid-like, all bonded arrangement of composite structural members. The understructures 66, 71 each have a moderate to high stiffness in order to react most wing and fuselage light load conditions such as heavy bending moments, torsion or skin in-plane shear stresses. "Stiffness", also known in the art as rigidity, refers to the ability of understructure 66, 71 to resist deformation in response an applied bending and/or torsional loads. The bonded second understructure 71 also minimizes up and down bending of the horizontal stabilizers 32 due to lateral gusts or maneuver loads by redistributing the resultant loads through the bonded failsafe joints between the components of the second understructure 71.

The understructures 66, 71 of the vertical stabilizer 30, and the horizontal stabilizers 32 are generally similar or identical in construction and arrangement, although the size and dimensions of their respective component parts may vary, depending upon the particular application. Each of the understructures 66, comprises a front spar 70 at the leading edge 56 of the stabilizer 30, 32, a mid spar 72 and an aft spar 76 at the trailing edge 58 of the stabilizer 30, 32. The spars 70, 72, 74 each has a relatively high elastic modulus and extend from the root 62 to the tip 62 of the stabilizer 30, 32, and divide the understructure 66, 71 into two cells 64. In other embodiments, however, the understructure 66, 71 may comprise more than three spars 70, 72, 74 and more than two cells 64. In one embodiment, each of the spars 70, 72, 74 may have a stiffness of approximately 45 million pounds per square inch. In the case of the vertical stabilizer 30 shown in FIG. 2, the rudder 34 is pivotally attached to the aft spar 74 by a series of lugs 78 which transfer loads from the rudder 34 to the understructure 66. Similarly, as shown in FIG. 2A, the elevators 36 of the horizontal stabilizers 32 are pivotally attached to the aft spar 74 by a series of lugs which transfer loads from the elevators 36 to the understructure 71. The root 60 of the spars 70, 72, 74 in each of the vertical and horizontal stabilizers 30, 32 is attached to bathtub fittings (not shown) or similar fittings on the fuselage 26 by attachment lugs 86 which may be formed of a metal, a composite or a combination of a composite and a metal.

The understructures 66, 71 each further include a plurality of longitudinally spaced, Z-shaped composite stiffeners 80, hereinafter called Z-stiffeners 80, which extend between and are bonded to the spars 70, 72, 74 at spaced apart locations along the span of each of the stabilizers 30, 32. The Z-stiffeners 80 function to stiffen the spars 70, 72, 74, as well as the skins 68, 69. The skin 68 of the vertical stabilizer 30 is bonded to the spars 70, 72, 74 as well as to the Z-stiffeners 80, as shown in FIG. 2. Similarly, skin 69 of the horizontal stabilizers 32 to is bonded the spars 70, 72, 74 as well as to the Z-stiffeners 80, as shown in FIG. 2A. Loads are transferred between the spars 70, 72, 74 by a plurality of composite cross-beams 82 which pass through the middle of the Z-stiffeners 80. The cross-beams 82 effectively divide up the load transferred between the spars 70, 72, 74. The spars 70, 72, 74 and the Z-stiffeners 80 have high fiber stiffness, differing interlaminar elastic constants and mixed Modes I, II, III to provide improved aerodynamic balanced lift and control stability during flight, thereby reducing the effort required to move control surfaces such as the rudder 34 and the elevators 36.

The skins 68, 69 are each further stiffened by elongate composite stringers 84 or similar stiffeners that extend in the span-wise direction of the respective stabilizers 30, 32 and are located between adjacent ones of the spars 70, 72, 74. The stringers 84 are bonded to the skins 68, 69 using a suitable structural adhesive that may be in film or paste form. The integrated and unitized understructures 66, 71 reduce unnecessary high hinge loads on critical control surfaces such as the rudder 34 and the elevators 36, and increase lift with minimum aircraft rotation while damping flutter loads on the empennage 24.

Figure 4:
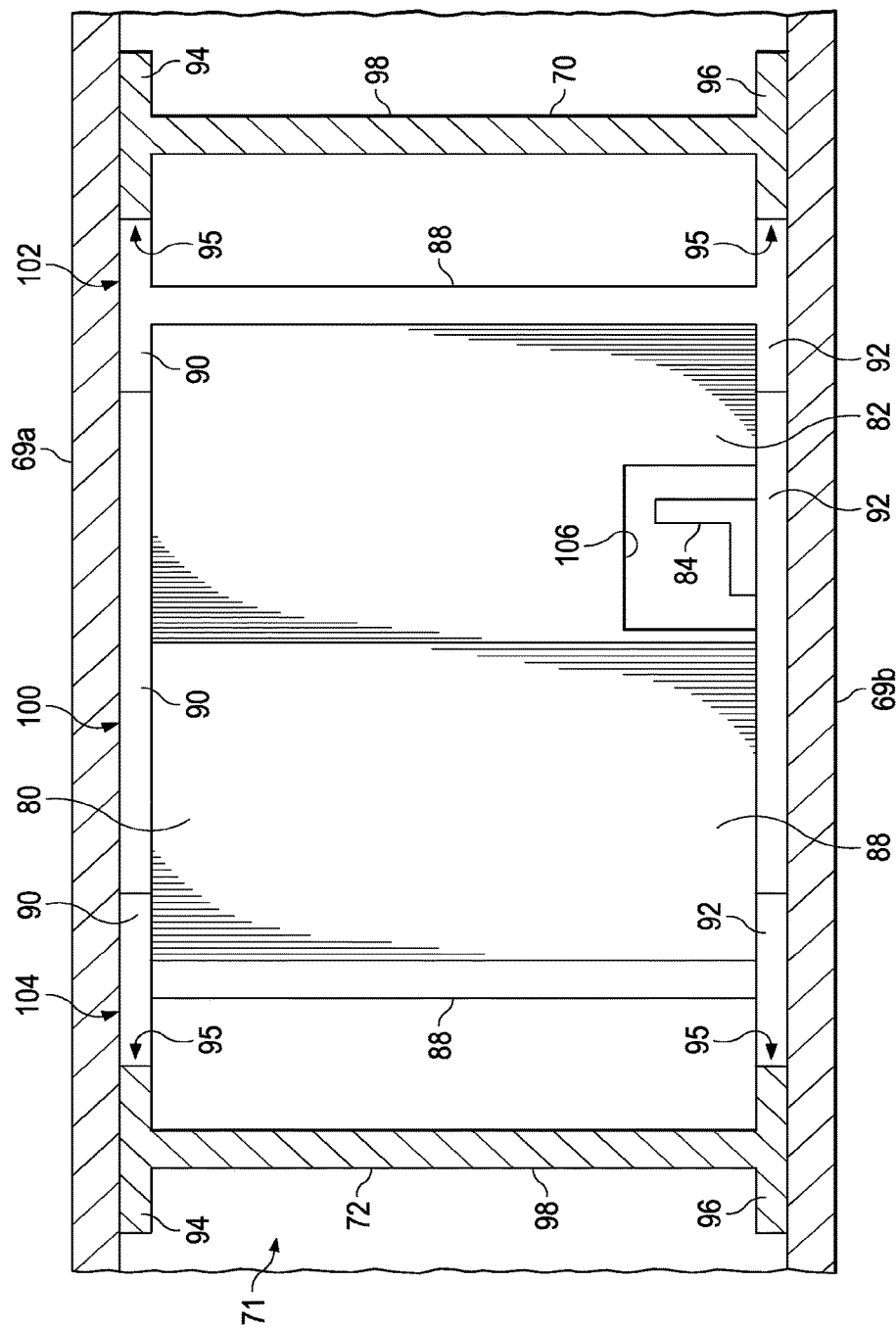
FIG. 4 is an illustration of a sectional view taken along the line 4-4 in FIG. 2A.

Referring to FIGS. 3 and 4, in one embodiment, each of the spars 70, 72, 74 may comprise a composite laminate such as carbon fiber epoxy formed, for example and without limitation, by bonding or co-curing two C-shaped members back-to-back along with the upper and lower caps. In the illustrated example, each of the spars 70, 72, 74 is an I-beam having a pair of caps 94, connected by a web 98, however other cross-sectional shapes are possible. The Z-stiffener 80 is a Z-shaped beam having a pair of caps 90, 92 connected by a web 88. The Z-stiffener 80 includes two outer legs 102, 104 bonded, and extending substantially parallel to the spars 70, 72, 74, and a diagonally extending leg 100 which is formed integral with the outer legs 102, 104. The Z-stiffener 80 may be a composite laminate such as carbon fiber epoxy that may be laid up, formed and cured using known techniques. The skins 68, 69 are adhesively bonded to the caps 90, 92 of the Z-stiffeners 80, as well as to the caps 94, 96 of the spars 70, 72, 74 of the respectively associated understructures 66, 71.

The cross-beam 82 passes through the middle leg 100 of the Z-stiffener 80 and is bonded to the web 88 at the outer legs 102, 104 of the Z-stiffener 80. The height of the cross-beam 82 is substantially equal to the height of the webs 88, 98. The cross-beam 82 as well as the web of the Z-stiffener 80 may have a mouse hole-like opening 106 therein to allow pass through of each of the stringers 84. The stringer 84 may have any of several known cross-sectional shapes, and in the illustrated example, is a blade type stiffener having one side 84a thereof bonded to the skin 68. The caps 90, 92 of the Z-stiffener 80 are respectively bonded at 95 (see FIG. 4) to the caps 94, 96 of the spars 70, 72, 74 using conventional techniques, such as by applying and curing a film or paste adhesive between the joining surfaces of the caps 90, 92, 94, 96. The edges of the caps 90, 92 of each of the Z-stiffeners 80 may have an adhesive paper spew (not shown) in order to reduce stress singularities that normally develop at the bonded joint run-outs.

Figure 5:
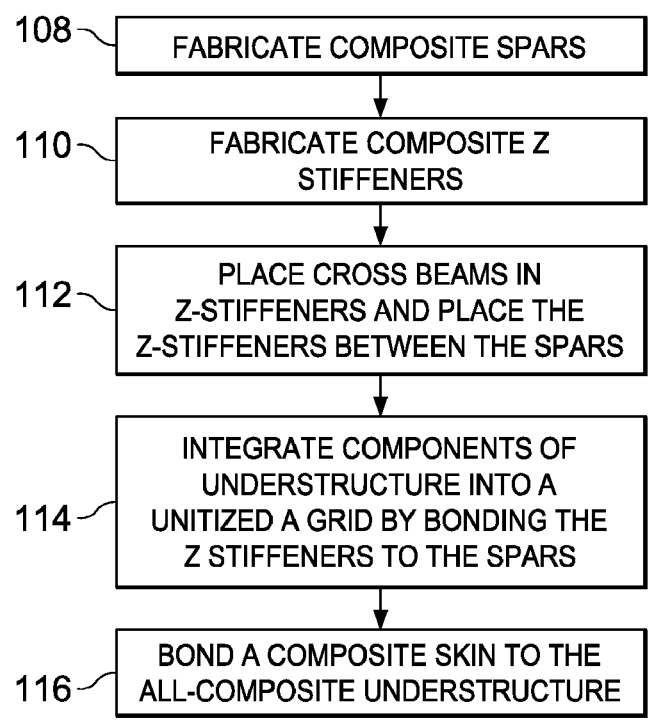
FIG. 5 is an illustration of a flow diagram of a method of making an all composite, bonded aircraft stabilizer.

The composite assembly 24, such as the empennage 24 comprising the all-composite vertical stabilizer 30, and the composite horizontal stabilizers 32, may be assembled using a series of steps broadly indicated in FIG. 5. At 108, the composite spars 70, 72, 74 are fabricated by laying up, forming and co-curing composite laminate components of each of the spars 70, 72, 74 and then bonding them together. Similarly, at step 110, the composite Z-stiffeners 80 are fabricated by laying up, forming and co-curing composite laminate components which are then bonded together. It may be possible to integrate cross-beams 82 into the Z-stiffeners 80 as part of the fabrication of the Z-stiffeners 80. At step 112 the understructure 66 is formed by placing the Z-stiffeners 80 between the spars 70, 72, 74 using suitable assembly tooling (not shown). At 114, the components of the understructure 66, 71 are integrated into a unitized grid by bonding the Z-stiffeners 80 the spars 70, 72, 74. With components of the understructure 66, 71 having been bonded together, then, at step 116, the composite skins 68, 69 are respectively bonded to opposite sides of the all-composite understructures 66, 71.

Figure 6:
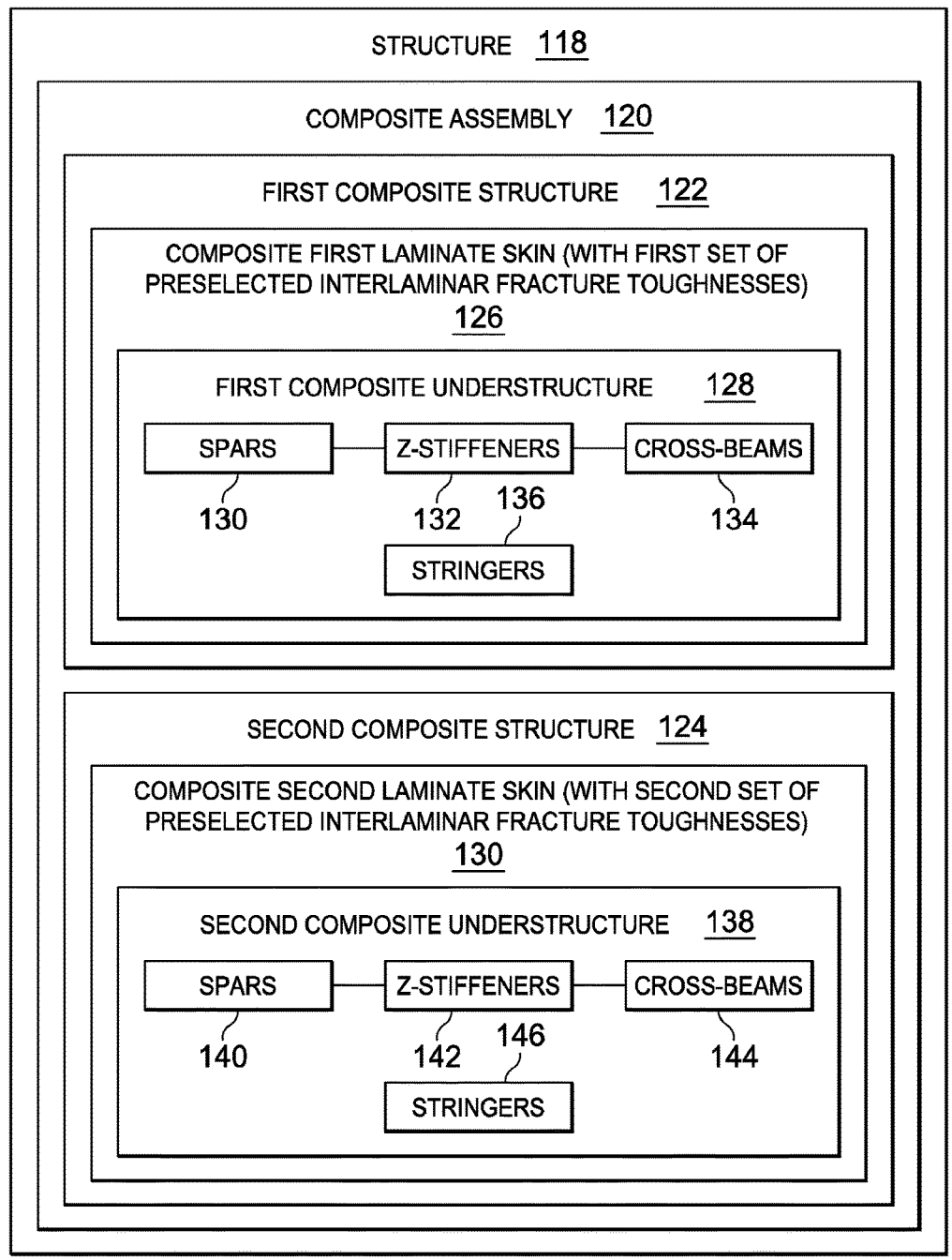
FIG. 6 is an illustration of an overall block diagram of a structure employing the disclosed composite assembly.

As previously mentioned, the aircraft empennage 24 described above is only one illustrative embodiment of the disclosed composite assembly 24. Other embodiments are possible that are suitable for use in other applications. Referring now to FIG. 6, a composite assembly 120 employing the principles discussed above may be used on, in or form a part of a structure 118. For example and without limitation, the structure 118 may comprise a windmill or other apparatus, and the composite assembly 120 may be employed to support the windmill other apparatus. The composite assembly 120 may be similar in construction, and have features and characteristics similar to the composite assembly 24 previously described.

The composite assembly 120 comprises a first composite structure 122 and at least one second composite structure 124. The first composite structure 122 may have a construction, features and characteristics that are similar to those of the vertical stabilizer 30 previously described. The first composite structure 122 broadly comprises a composite first laminate skin 126 bonded to and covering a first composite understructure 128. The composite first laminate skin 126 may be similar in construction, features and characteristics to the composite outer skin 68 previously described, and possesses a first set of preselected interlaminar fracture toughnesses suitable for the application. The first composite understructure 128 may be similar in construction, features and characteristics to the all composite, integrated grid, understructure 66 previously described and may include all composite spars 130, Z-stiffeners 132, crossbeams 134 and stringers 136.

The second composite structure 124 may be similar in construction, features and characteristics to the horizontal stabilizers 32 previously described. The second composite structure 124 includes a composite second laminate skin 130 possessing a second set of preselected interlaminar fracture toughnesses suitable for the application. The composite second laminate skin 130 may be similar in construction, features and characteristics to the second composite outer skin 69 previously described. The second composite structure 124 may further include a second composite understructure 138 bonded to and covered by the composite second laminate skin 130. The second composite understructure 138 may be similar in construction, features and characteristics to the all composite, integrated grid understructure 68 previously described, and may include all composite spars 140, Z-stiffeners 142, crossbeams 144 and stringers 146.

Principles and features of the composite assembly 24, 120 described above may be incorporated into or used in combination with other embodiments and structures, such as, without limitation, the aircraft wing 22 described below and illustrated in FIGS. 1 and 7-16. The aircraft wing 22 shown in FIGS. 1 and 7-16 utilizes wing skin-grid differential features to improve wing-fuselage structural performance, and reduce manufacturing costs through lighter weight bonded designs. The disclosed wing 22 may also reduce part count, may reduce or eliminate corrosion and may provide a higher structural margin of safety. The bonded aircraft wing 22 exhibits increased wing design efficiency, is extremely light weight and provides fuel savings, while reducing or eliminates the need for fasteners to fasten the wing skins to the inner wing-grid and the spars. The wing 22 has the ability to contain discrete damage, such as that caused by engine explosion.

In one exemplary embodiment, the bonded composite aircraft wing 22 may include a composite inner wing-grid structure 152 (hereinafter sometimes referred to as a wing-grid or wing-grid structure), and upper and lower composite wing skins 25, 27 that may be specifically tailored to satisfy different load cases, such as higher lift, loads during maneuvers, up and down bending, shear and torsional loads, lateral gusts, and engine thrust. The wing's fail-safe bonded inner wing-grid structure 152 provides self-containment in the event of discrete damage and substantial reduction of the interlaminar singular peel and shear stress at intersections of wing-grid spars and grid cross beams which form the wing-grid structure 152. Adhesives may be used to bond the wing-grid spars and/or the grid cross-beams to upper and lower composite wing skins. The upper and lower wing skins 25, 27 may have differing interlaminar fracture toughnesses that include a graduated stiffness reacting wing loads. Unitized constant interface bonded properties throughout the wing-grid mitigate torsional loads and bending due to turbulence.

Figure 7:
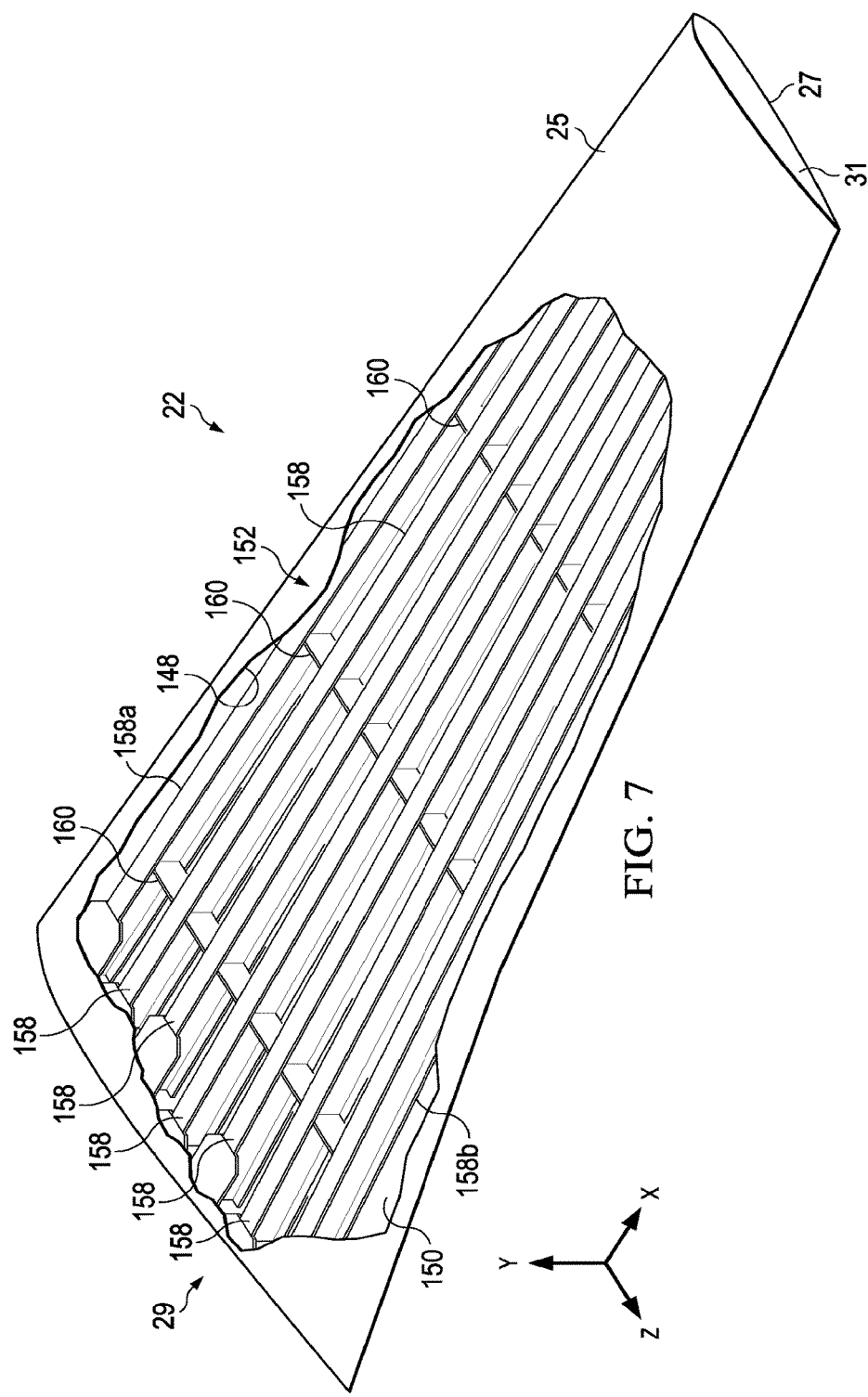
FIG. 7 is a perspective illustration of a portion of the right-side wing shown in FIG. 1, a portion of the upper wing skin removed to better reveal the inner wing-grid-structure.

FIG. 7 is a perspective illustration of one of the wings 22 shown in FIG. 1, a portion of the upper composite wing skin 25 being broken away to reveal an inner composite wing-grid structure 152 which will be described in more detail below. The composite wing-grid structure 152 comprises a grid of intersecting composite structural support members which may be cocured, and is bonded to the inner surfaces 148, 150 respectively of the upper and lower composite wing skins 25, 27 using a suitable adhesive which may be in film or paste form. Thus, the upper and lower wing skins 25, 27 are attached to the wing-grid structure 152 by bonded joints, thereby obviating the need for discrete fasteners.

The wing-grid structure 152 comprises a plurality of wing-grid spars 158 extending in the span-wise or X-direction from the root 29 to the tip 31 of the wing 22, and a plurality of intersecting composite support members, hereinafter referred to as grid cross beams 160, extending in the chord-wise or Y-direction, traverse to the wing-grid spars 158. The wing-grid spars 158, grid cross beams 160 and upper and lower skins 25, 27 may form a wing box that includes a leading edge grid spar 158a, and a trailing edge grid spar 158b to which leading and trailing edge assemblies (not shown) are respectively attached.

In some embodiments, the leading and trailing edge grid spars 158a, 158b may be larger and/or stiffer that the other wing-grid spars 158 (sometimes referred to as mid-body spars) in order to transfer loads between the wingbox and the leading and trailing edge assemblies. The wing-grid spars 158 may be substantially uniform in cross section and other characteristics along their respective lengths.

The upper and lower composite wing skins 25, 27 respectively have differing interlaminar fracture toughnesses in Modes I, II and II respectively, resulting in the upper and lower wing skins 25, 27 having differing stiffnesses that are specifically tailored to meet both static and dynamic global loads of a particular aircraft application. The interlaminar fracture toughnesses of the upper and lower wing skins 25, 27 may be selected such that when the aircraft 20 (FIG. 1) is on the ground, the upper wing skin 25 is in tension and the lower wing skin 27 is in compression, but during flight, the upper and lower wing skins 25, 27 are respectively in compression and tension.

Employing different interlaminar fracture toughnesses of composite wing skins 25 and 27 in combination with the composite wing-grid structure 152 better distributes wing loads during flight over a wider structural area, and may reduce or eliminate the need for structural chord webs typically used in traditional wing structures, while minimizing the number of spars required. Moreover, the use of upper and lower wing skins 25, 27 having differing interlaminar fracture toughnesses in combination with the wing-grid structure 152 better reacts a variety of forces applied to the wings 22 including bending moments, torsion, shear stresses, up and down bending due to lateral gusts or maneuver loads during flight.

Each of the upper and lower composite wing skins 25, 27 respectively, is orthotropic and comprises a stack of laminated layers/plies of fiber-reinforced resin materials, such as carbon fiber epoxy, having relatively high strength-to-weight ratios. Each of the plies may comprise unidirectional reinforcing fibers of a desired angular orientation. For example, each of the wing skins 25, 27 may comprise multiple laminated plies respectively having fiber orientations of 0°, 45° and 90°. The 0° plies are generally oriented in the span-wise or X axis direction, while the 90° plies are oriented in the chord-wise or Y axis direction. The 45° plies included in the ply stack react in-plane, off angle loads and function to lower the Poisson's ratio effect.

Differing interlaminar fracture toughnesses of the upper and lower wing skins 25, 27 may be achieved by varying any one or more of several wing skin parameters, resulting in the upper and lower wing skins 25, 27 having differing stiffnesses. For example, although the ply schedule (stack) used to fabricate the upper and lower wing skins 25, 27 may both be orthotropic, the ply schedule used for the upper wing skin 25 may have fewer 0° plies than the ply schedule used for the lower wing skin 27, resulting in the upper wing skin 25 being less stiff and orthotropic than the lower wing skin 27. Alternatively, the desired difference in interlaminar fracture toughness of the upper and lower skins 25, 27 may be achieved by using a different resin, using a different fiber material, or using a different fiber diameter in the upper wing skin 25, compared to that used in the lower wing skin 27. Depending on the application, the ply schedules for the upper and lower wing skins 25, 27 may or may not vary layer-by-layer in either the span-wise or chord-wise directions. The use of wing skins 25, 27 having differing interlaminar fracture toughnesses and stiffnesses allows the bending, torsion and vertical deflection of the wings 22 to be tailored in a manner that optimizes distribution of the wing lift, thereby increasing overall wing lift.

Upper composite wing skin 25 may have, in one typical embodiment, an interlaminar fracture toughness of about 3.0 in-lbs/in$^2$ to about 5.0 in-lbs/in$^2$ in Mode I, about 4.5 to about 7.0 in Mode II and about 7.5 to about 8.5 in Mode III. These ranges of interlaminar fracture toughness facilitate the wing's ability to react to different wing flight loads due to independent structural composite bending, torsion, and stiffness capability, while retarding or arresting the propagation of cracks. The lower composite wing skin 27 has a higher interlaminar fracture toughnesses than the upper wing skin 25. For example, the lower composite wing skin 27 may have an interlaminar fracture toughness of about 4.5 in-lbs/in$^2$ to about 6.5 in-lbs/in$^2$ in Mode I, 5.5 in-lbs/in$^2$ to about 8.0 in-lbs/in$^2$ in Mode II, and about 8.5 in-lbs/in$^2$ to about 12.0 in-lbs/in$^2$ in Mode III. These ranges of interlaminar fracture toughnesses provide the lower wing skin 27 with unique structural tension-shear-stiffness characteristics that better react to wing bending and torsion loads.

Upper composite wing skin 25 is formed with a lower interlaminar fracture toughness than lower composite wing skin 27 such that during flight, upward bending of the wing places the upper composite wing skin in compression while the bottom wing skin 27 is in tension. In addition, the composite wing-grid structure 152 provides rigidity to upper and lower wing skins 25 and 27 during flight. In other embodiments, upper composite wing skin 25 may have an interlaminar fracture toughness of greater than or lower than 4.0 in-lbs/in$^2$, and lower composite wing skin 27 may have an interlaminar fracture toughness of greater than or lower than 6.0 in-lbs/in$^2$, where lower wing 27 has an interlaminar fracture toughness greater than the interlaminar fracture toughness of upper wing skin 25.

Structural composite stiffness properties are partly derived from high modulus fibers of advanced composite structural materials for upper and lower wing skins 25 and 27. High stiffness-to-strength ratio fibers in the structural resin reinforce high interlaminar toughness of the structural resin with specified structural properties in modes I, II & III critical wing load cases, respectively. The mode I property provides for load carrying capability of wings 22, while the mode II property provides for in-plane loads and for resisting damage of wings 22. The mode III property provides for twisting/torsional rigidity of wings 22.

Upper composite wing skin 25 structural properties have moderately high mode I and mode II interlaminar fracture toughness. The mode I structural property is designed to increase the load carrying capability of upper composite wing skin 25 under normal loads induced by bending, and compression induced during take-off and in flight. The mode II interlaminar toughness property for upper composite wing skin 25 is designed to take more in-plane shear loads due to bending and torsion, thus increasing the capability of the wing to sustain higher aerodynamic loads.

The structural composite properties of the lower composite wing skin 27 are designed to have higher mode I, II and III structural interlaminar toughnesses compared to the corresponding properties of the upper wing skin 25. These structural properties are selected to increase the capability to carry global heavy interlaminar tension and in-plane shear loads in lower composite wing skin 27 induced by up-bending. The mode III structural interlaminar toughness of the lower composite wing skin 27 is designed to increase the capability of the wing to react to the twisting moment at the thick inboard side of wings 22 due to heavy fuselage loads. Additionally, an increase in the mode III property, which is the twisting/torsional rigidity property, results in higher lift and produces a balanced twisting angle of the wing.

The wing-grid structure 152 discussed above may be implemented using any of a variety of composite structural configurations employing wing-grid spars 158 that are reinforced and/or are stabilized by grid cross beams 160. For example, referring to FIGS. 8 and 9, the wing-grid spars 158 may each comprise a composite I-beam 159 having an upper cap 164 and a lower cap 166 joined together by a web 162. The upper caps 164 are adhesively bonded to the inner surface 148 of upper wing skin 25 along a bond line 165, and the lower caps 166 are adhesively bonded to the inner surface 150 of the lower wing skin 27 along a bond line 167. In this example, the grid cross beams 160 comprise individual, substantially flat composite webs 168 that extend between adjacent ones of the I-beams 159 and are adhesively bonded along bond lines 163 to be webs 162 of the wing-grid spars 158. In alternative embodiments, the I-beams 159 and the grid cross beam webs 168 may be laid up and co-cured.

Attention is now directed to FIGS. 10 and 11 which illustrate an alternate form of the wing-grid structure 152. In this example, the composite I-beams 159 forming the wing-grid spars 158 are reinforced and stabilized by grid cross beams 160 which are also I-shaped in cross section. Each of the grid cross beams 160 comprises upper and lower caps 170, 172 joined together by a web 168. The upper and lower caps 170, 172 respectively are substantially coplanar with the corresponding upper and lower caps 164, 166 of the wing-grid spars 158, thereby providing a larger bond area between the wing-grid structure 152 and the upper and lower wing skins 25, 27, compared to the embodiment shown in FIGS. 8 and 9. In some embodiments, the grid cross beams 160 may be laid up and co-cured with the wing-grid spars 158, while in other embodiments they may be adhesively joined together in a secondary bonding operation.

The upper caps 164, 170 are adhesively bonded to the inner surface 148 of the upper wing skin 25 along a bond line 169 in a secondary bonding operation. Similarly, the lower caps 166, 172 are adhesively bonded to the inner surface 150 of the lower wing skin 27 along a bond line 171, also in a secondary bonding operation. In the example shown in FIGS. 10 and 11, the grid cross beams 160 are substantially aligned in the chord-wise direction of the wing 22, however in other embodiments the grid cross beams 160 may be staggered or offset from each other in the span-wise direction of the wing 22.

Figure 12:
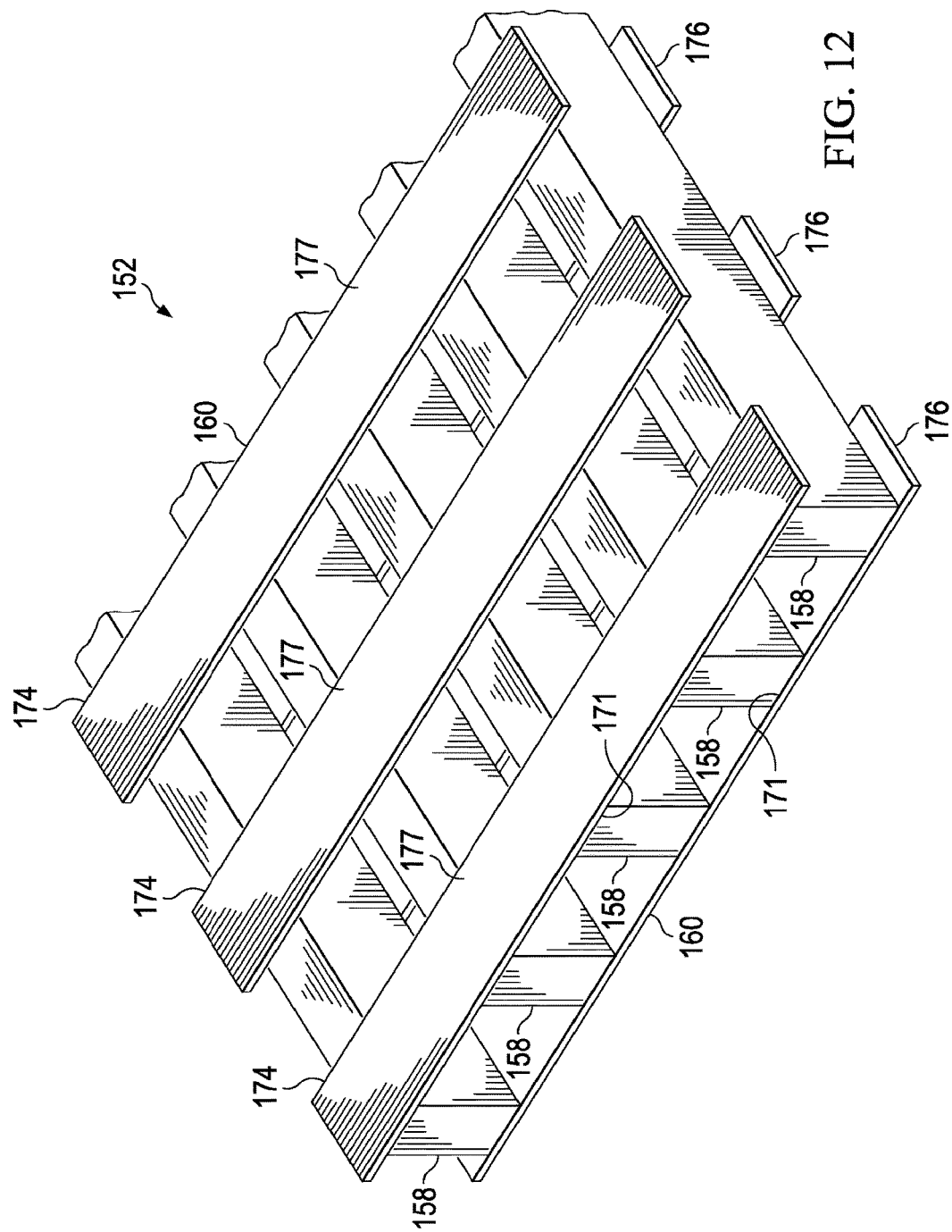
FIG. 12 is a perspective illustration of another form of the wing-grid structure, the wing skins not shown for clarity.

FIG. 12 illustrates still another embodiment of the wing-grid structure 152, the upper and lower composite wing skins 25, 27 not shown for clarity. The grid cross beams 160 comprise upper and lower, substantially flat, composite cross beam straps 174, 176 which may be longitudinally spaced apart in the span-wise direction of the wing 22, and which extend transversely across the wing-grid spars 158. In the illustrated example, the wing-grid spars are only generically indicated by the numeral 158. The cross beam straps 174, 176 may be laid up over and cocured with the wing-grid spars 158. The cross beam straps 174, 176 have outer, flat bonding surfaces 177 to which the upper and lower wing skins 25, 27 may be adhesively bonded along bond lines 171 in a secondary bonding operation. Alternatively, the cross beam straps 174, 176 may be laid up over and cocured with the wing-grid spars 158.

Figure 13:
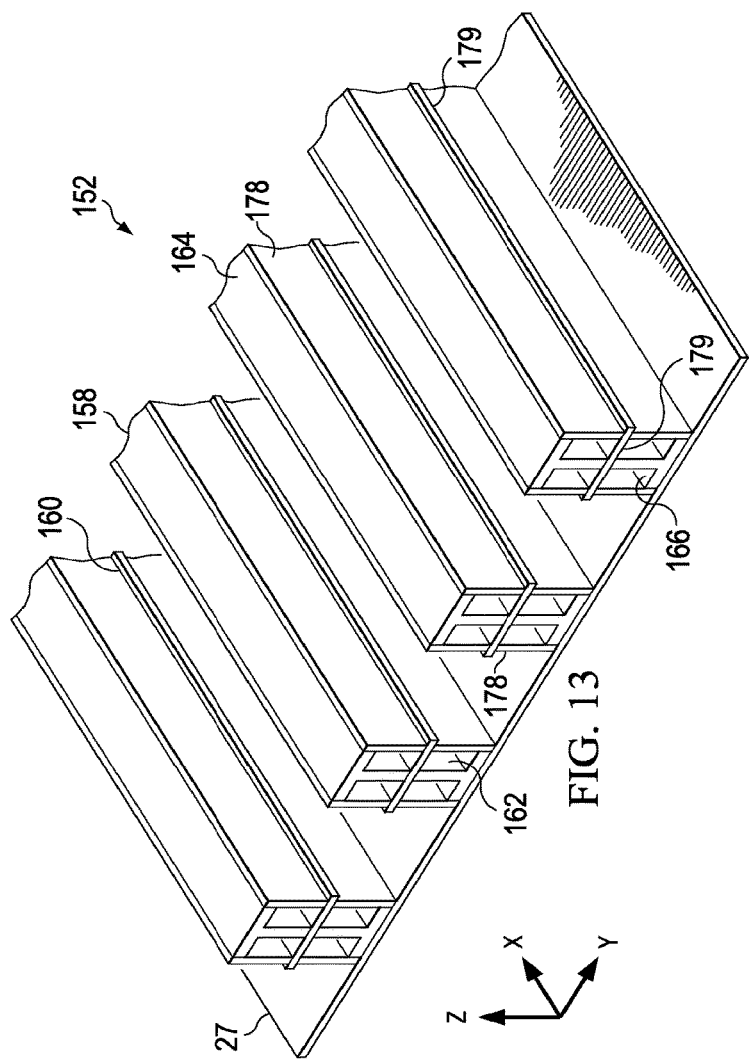
FIG. 13 is a perspective illustration of a portion of a wing employing another form of the wing-grid structure, the upper wing skin not shown for clarity.

FIG. 13 illustrates yet another embodiment of the wing-grid structure 152 which employs I-beam type wing-grid spars 158, similar to the I-beams 159 previously discussed in connection with FIGS. 8-11. In this example, the I-beam shaped wing-grid spars 158 are further stiffened and stabilized by composite laminate side webs 178. In order to stiffen the wing-grid structure 152 in the chord-wise direction, each of the wing-grid spars 158 is provided with a center stiffener 179 extending in the X-Y plane. The center stiffeners 179 extend through the webs 162 and into the side webs 178, and function as the grid cross beams 160 previously described, to provide the wings 22 with the desired torsional rigidity and shear strength. Similar to the embodiments shown in FIGS. 8-11, the upper and lower caps 164, 166 are bonded directly to the upper and lower wing skins 25, 27 respectively, resulting in transmission of loads through bond lines (not shown) between the wing skins 25, 27 and the wing-grid structure 154.

Figure 14:
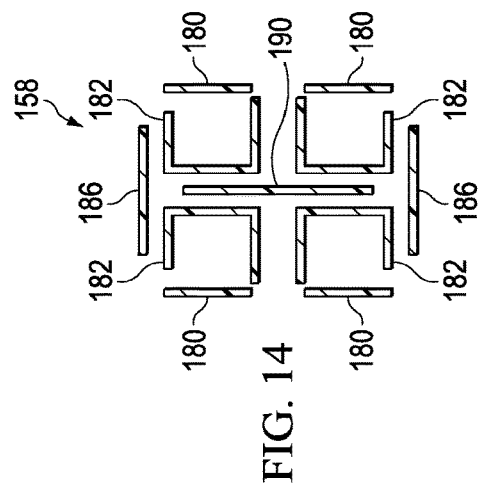
FIG. 14 is a diagrammatic illustration showing how standard composite components may be combined to form the wing-grid structure shown in FIG. 13.

FIG. 14 illustrates one assembly that may be employed to fabricate the wing-grid structure 152 shown in FIG. 13, using simple pre-formed composite laminate segments. Four preformed C-shaped segments 182 are pre-positioned against a center web segment 190. Side web segments 180, which form side webs 178 (FIG. 13), are then positioned over the outer sides of the C-shaped segments 182. Cap segments 186 are placed over the assembled C-shaped segments 182, thereby forming a layup assembly that comprises all of the elements of the wing-grid structure 152 shown in FIG. 13. The composite laminate segments shown in FIG. 14 are laid up in sequence and then co-cured.

Figure 15:
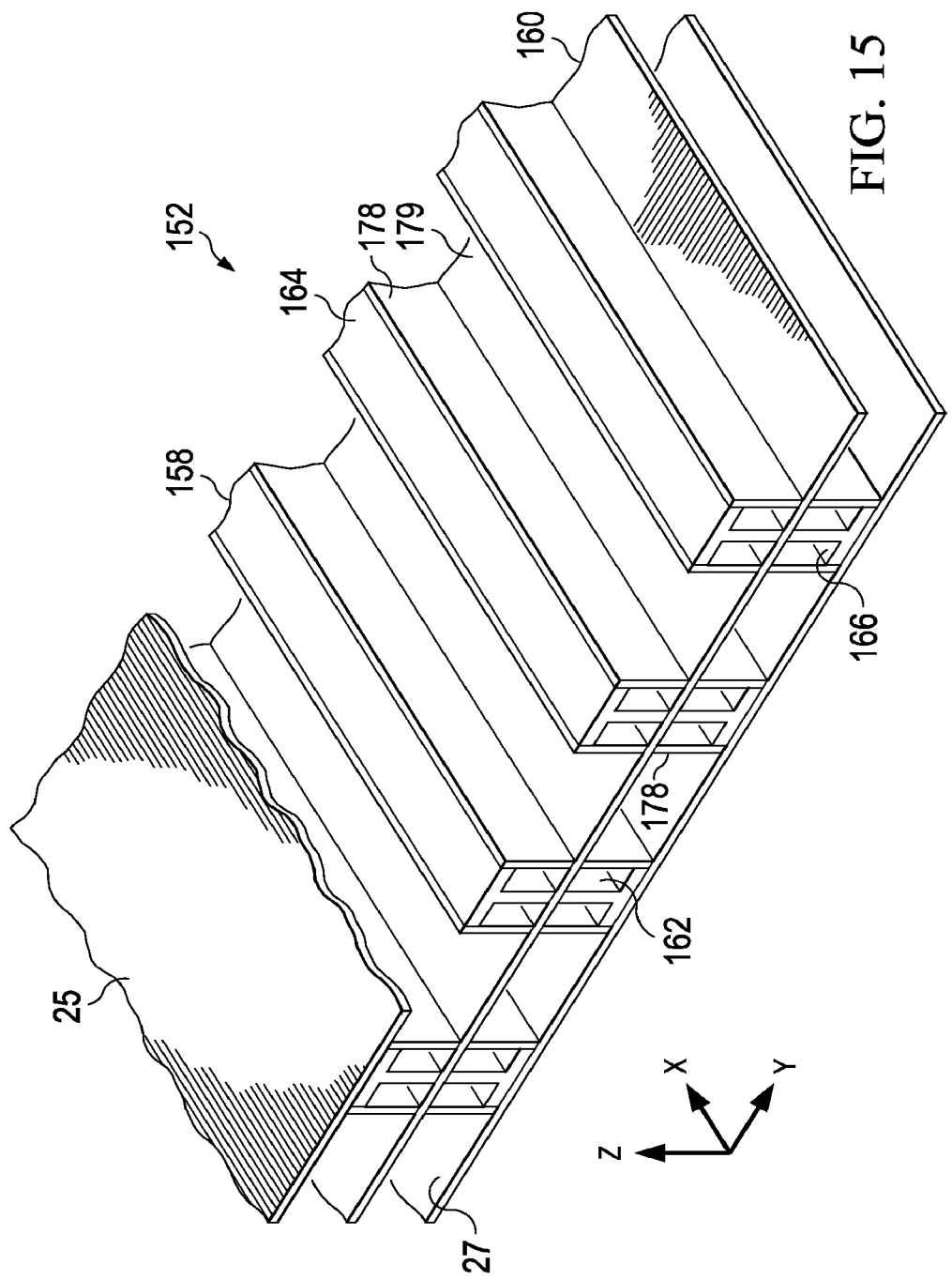
FIG. 15 is a perspective illustration similar to FIG. 13, but showing a further form of the wing-grid structure.

FIG. 15 illustrates another embodiment of the wing-grid structure 152, similar to that shown in FIG. 13, with the exception that the center stiffener 179 extends continuously in the chord-wise direction between the wing-grid spars 158, as well as continuously in the span-wise direction of the wing 22. In some forms, the center stiffener 179 may have gaps therein between adjacent ones of the wing-grid spars in order to reduce wing weight. For example, the center stiffener 179 may comprise a series of individual, spaced apart center stiffener straps that pass through the wing-grid spars 40.

Figure 16:
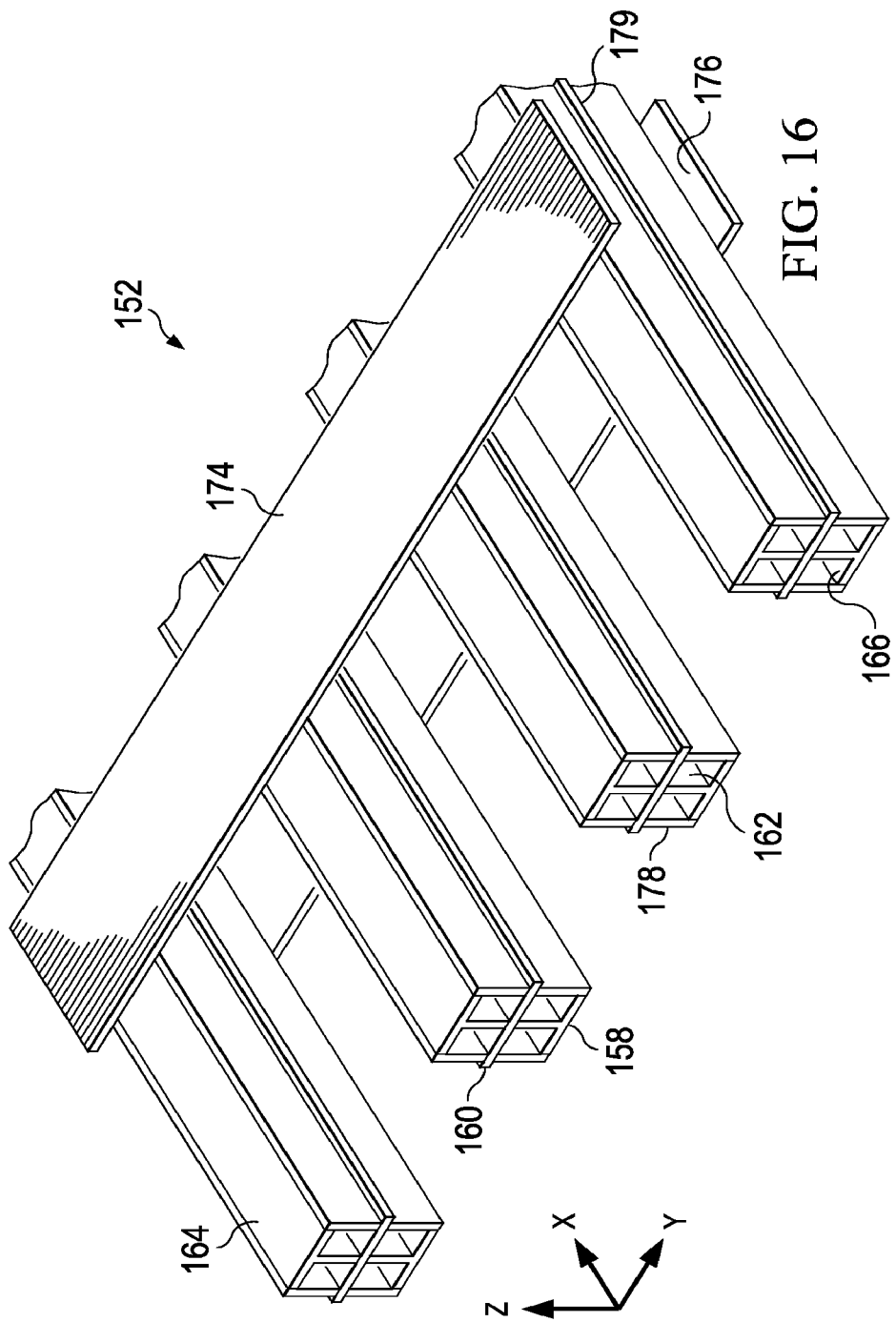
FIG. 16 is a perspective illustration of another form of the wing-grid structure employing cross beam straps, the wing skins not shown for clarity.

FIG. 16 illustrates another variation of the wing-grid structure 152 that combines features of the embodiments previously discussed in connection with FIGS. 12 and 13. In this embodiment, the grid cross beams 160 are formed by upper and lower cross beam straps 174, 176 which are bonded to or co-cured with the wing-grid spars 158. The upper and lower cross beam straps 174, 176 may be spaced apart in the span-wise direction, similar to the embodiment shown in FIG. 12, or may be continuous or semi-continuous in the span-wise direction of the wing 22. The upper and lower cross beam straps 174, 176 may have a thickness sufficient to react transverse shear loads and bending in the chord-wise direction.

Figure 17:
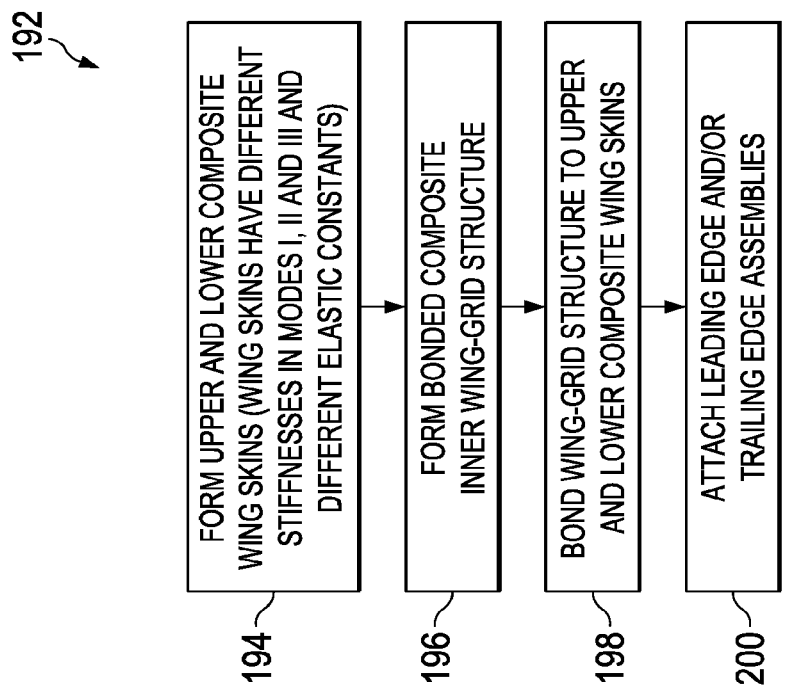
FIG. 17 is a block flow diagram of a method of making an aircraft wing.

FIG. 17 broadly illustrates the steps of a method 192 of making an aircraft wing 22 of the type previously described. Beginning at step 194, upper and lower composite wing skins 25, 27 are formed which respectively have differing interlaminar fracture toughnesses and stiffnesses in Modes I, II and III, as well as different elastic constants. As previously mentioned, differing interlaminar fracture toughnesses and stiffnesses may be imparted to the wing skins 25, 27 by varying the one or more material characteristics, such as the number of plies having a particular ply orientation, such as 0° plies, in the skin. Following ply layup of each of the wing skins 25, 27, they are each cured. At step 196, an inner wing-grid structure 152 is formed by laying up the elements comprising the wing-grid spars 158 and the grid cross beams 160 previously discussed, using suitable layup and assembly tooling. Following layup, the wing-grid spars 158 and the grid cross beams 160 are co-cured together to form a fully consolidated and integrated wing-grid structure 152. At step 198, the pre-cured upper and lower composite wing skins 25, 27 are adhesively bonded to the pre-cured wing grid structure 152, in a secondary bonding operation, to form a completed wing box. At step 202, leading edge and/or trailing edge assemblies may be attached to the wing box, as desired.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of making a composite structure, comprising:
fabricating a plurality of composite spars;
fabricating a plurality of composite stiffeners;
forming a composite understructure by bonding the composite spars and the composite stiffeners together, such that:
the composite structure comprises the composite understructure and a composite first laminate skin bonded to the understructure;
the composite first laminate skin comprises a first set of pre-selected interlaminar fracture toughnesses; and
the understructure comprises:
a plurality of longitudinally extending composite spars, and
a plurality of Z-shaped composite stiffeners extending between and bonded to the spars, and a plurality of longitudinally extending, composite stringers passing through the Z-shaped composite stiffeners and bonded to at least one of: the composite first laminate skin, and composite second laminate skin;
at least one second composite structure, the second composite structure comprising a composite second understructure and a composite laminate second skin bonded to the second understructure, the composite laminate second skin comprising a second set of pre-selected interlaminar fracture toughnesses; and
bonding first and second composite skins on opposite sides of the composite understructure.

2. The method of claim 1, further comprising:
each of the composite first laminate skin and the composite laminate second skin being subject to Mode I, II and III loading; and
the first set of pre-selected interlaminar fracture toughness and the second set of pre-selected interlaminar fracture toughnesses differing from each other in the Modes I, II, and III loading.

3. The method of claim 1, wherein:
the composite structure comprises a first torsional stiffness; and
the second composite structure comprises a second torsional stiffness, the first torsional stiffness being greater than the second torsional stiffness.

4. The method of claim 3, wherein:
the first torsional stiffness comprises a range comprising approximately 45.0 to 52.0 million pounds per square inch; and
the second torsional stiffness comprises a range comprising approximately 40.0 to 50.2 million pounds per square inch.

5. The method of claim 1, wherein:
the first set of pre-selected interlaminar fracture toughnesses of the composite laminate first skin of the composite structure comprises:
a Mode I interlaminar fracture toughness within a range that comprises approximately 4.0 to 6.5 inch-pounds per square inch;
a Mode II interlaminar fracture toughness within a range that comprises approximately 12.0 to 15.5 inch-pounds per square inch; and
a Mode III interlaminar fracture toughness within a range that comprises approximately 16.0 to 18.5 inch-pounds per square inch.

6. The method of claim 5, wherein the second set of pre-selected interlaminar fracture toughnesses of the composite laminate second skin of the second composite structure comprises:
a Mode I interlaminar fracture toughness within a range that comprises approximately 2.5 to 3.5 inch-pounds per square inch;

a Mode II interlaminar fracture toughness within a range that comprises approximately 7.5 to 9.5 inch-pounds per square inch; and a Mode III interlaminar fracture toughness within a range that comprises approximately 18.0 to 20.5 inch-pounds per square inch.

7. The method of claim 1, further comprising:

passing a plurality of substantially straight composite cross-beams respectively through the Z-shaped composite stiffeners and extending substantially normal to the composite spars.

8. The method of claim 1, further comprising:

forming an aircraft empennage via arranging the composite structure and the second composite structure.

9. The method of claim 1, further comprising:

an aircraft vertical stabilizer that comprises the composite structure; and an aircraft horizontal stabilizer that comprises the second composite structure.

10. A method of forming an empennage for an aircraft, the method comprising:

forming composite first understructure via forming a first integrated grid via bonding together: first composite spars, first composite cross-beams, and first composite stiffeners;

forming a vertical stabilizer via bonding the composite first understructure to a composite laminate first skin, wherein the composite laminate first skin comprises:

a Mode I interlaminar fracture toughness within a range comprising approximately 4.0 to 6.5 inch-pounds per square inch;

a Mode II interlaminar fracture toughness within a range comprising approximately 12.0 to 15.5 inch-pounds per square inch; and a Mode III interlaminar fracture toughness within a range comprising approximately 16.0 to 18.5 inch-pounds per square inch; and forming a pair of horizontal stabilizers, via forming each of the horizontal stabilizers respectively via bonding comprising a composite second understructure a composite laminate second skin, the composite second understructure comprising a second integrated grid that comprises second composite spars, second composite cross-beams, and second composite stiffeners bonded together.

11. The method of claim 10, wherein the composite laminate second skin comprises:

a Mode I interlaminar fracture toughness within a range that comprises approximately 2.5 to 3.5 inch-pounds per square inch;

a Mode II interlaminar fracture toughness within a range that comprises approximately 7.5 to 9.5 inch-pounds per square inch; and a Mode III interlaminar fracture toughness within a range that comprises approximately 18.0 to 20.5 inch-pounds per square inch.

12. The method of claim 10, wherein the vertical stabilizer comprises a torsional stiffness in a range that comprises approximately 45.0 to 52.0 million pounds per square inch.

13. The method of claim 10, wherein each of the horizontal stabilizers comprises a bending stiffness in a range that comprises approximately 30.0 to 36.5 million pounds per square inch.

14. The method of claim 10, wherein each of the spars comprises a bending stiffness of approximately 45 million pounds per square inch.

15. The method of claim 10, wherein:

each of the composite stiffeners comprises a Z-shape; and each of the composite cross-beams passes through a Z-shaped composite stiffener.

16. A method of forming an aircraft empennage, the method comprising:

forming a vertical stabilizer via bonding a composite first understructure to a composite laminate first skin bonded, the composite laminate first skin being:

subject to Mode I, II and III loading; and comprising a first set of interlaminar fracture toughnesses in Modes I, II, and III; and forming at least one horizontal stabilizer via bonding a composite second understructure to a composite laminate second skin bonded, the composite laminate second skin being:

subject to Mode I, II and III loading; and comprising a second set of interlaminar fracture toughnesses in Modes I, II, and III that are lesser in value than the first set of interlaminar fracture toughnesses.

17. The method of claim 16, wherein the composite laminate first skin further comprises:

a Mode I interlaminar fracture toughness within a range that comprises approximately 4.0 to 6.5 inch-pounds per square inch;

a Mode II interlaminar fracture toughness within a range that comprises approximately 12.0 to 15.5 inch-pounds per square inch; and a Mode III interlaminar fracture toughness within a range that comprises approximately 16.0 to 18.5 inch-pounds per square inch.

18. The method of claim 16, wherein:

the vertical stabilizer comprises a torsional stiffness in a range that comprises approximately 45.0 to 52.0 million pounds per square inch; and the horizontal stabilizer comprising a torsional stiffness in a range that comprises approximately 40.0 to 50.2 million pounds per square inch.

* * * * *